(12) United States Patent
Li

(10) Patent No.: US 10,659,180 B2
(45) Date of Patent: May 19, 2020

(54) CIRCUIT DELAY SELF-MEASUREMENT METHOD, DEVICE AND SYSTEM

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 16/346,530

(22) PCT Filed: Sep. 1, 2017

(86) PCT No.: PCT/CN2017/100212
§ 371 (c)(1),
(2) Date: Apr. 30, 2019

(87) PCT Pub. No.: WO2018/082391
PCT Pub. Date: May 11, 2018

(65) Prior Publication Data
US 2019/0305862 A1    Oct. 3, 2019

(30) Foreign Application Priority Data

Nov. 7, 2016   (CN) .......................... 2016 1 0977256
Nov. 7, 2016   (CN) .......................... 2016 1 0978228

(51) Int. Cl.
*H04B 17/364*    (2015.01)

(52) U.S. Cl.
CPC .................. *H04B 17/364* (2015.01)

(58) Field of Classification Search
CPC ........ H04B 17/36; H04B 17/30; H04B 17/40; H04B 17/408; H04B 1/0032
USPC ....................................................... 455/67.14
See application file for complete search history.

(56) References Cited

U.S. PATENT DOCUMENTS

| 7,420,455 B2 | 9/2008 | Nowottnick |
| 2003/0220765 A1 | 11/2003 | Overy et al. |

FOREIGN PATENT DOCUMENTS

| CN | 1717705 A | 1/2006 |
| CN | 1866801 A | 11/2006 |
| CN | 102647461 A | 8/2012 |
| CN | 104660330 A | 5/2015 |
| CN | 105307172 A | 2/2016 |

OTHER PUBLICATIONS

International Patent Application No. PCT/CN2017/100212; Int'l Search Report; dated Dec. 13, 2017; 3 pages.

*Primary Examiner* — Eugene Yun
(74) *Attorney, Agent, or Firm* — BakerHostetler

(57) ABSTRACT

The present disclosure provides a circuit delay self-measurement method, device and system. The device includes: a first communication interface, configured to receive a first analog signal; a receiving circuit module, configured to perform a first processing on the first analog signal to generate a first digital signal; a main control chip, configured to generate a second analog signal; a first switch module, configured to turn off a path between the first stationary end and the first connection end and turn on a path between the first stationary end and the second connection end; the main control chip is configured to send the second analog signal to the receiving circuit module; the receiving circuit module is configured to perform the first processing on the second analog signal to generate a second digital signal; the main control chip is configured to determine the circuit delay of the receiving circuit module.

20 Claims, 8 Drawing Sheets

US 10,659,180 B2

CIRCUIT DELAY SELF-MEASUREMENT METHOD, DEVICE AND SYSTEM

CROSS REFERENCE TO RELATED APPLICATIONS

This application is a U.S. national phase application of International Application No. PCT/CN2017/100212 filed on Sep. 1, 2017, which claims priority to Chinese patent application Serial No. 201610977256.7 filed on Nov. 7, 2016 and Serial No. 201610978228.7 filed on Nov. 7, 2016, the entire content of which is incorporated herein by reference.

FIELD

The present disclosure relates to the field of circuit delay detection, and more particularly, to a circuit delay self-measurement method, device and system.

BACKGROUND

At present, the near field communication method is widely adopted in various fields (e.g. payment), and the communication between device A and device B that uses the near field communication method (e.g. RFID, NFC, infrared or Bluetooth) may have safety hazards. For example, as illustrated in FIG. 1, if the data channel established by device A and device B is intervened by a third party, the data during the entire communication process arrives at the other device through a third party without the knowledge of both rightful parties, eventually resulting in data leakage.

SUMMARY

In one aspect, the present disclosure provides a circuit delay self-measurement method, including: receiving a first analog signal, and performing a first processing on the first analog signal to generate a first digital signal; obtaining the first digital signal, performing a second processing on the first digital signal to generate a second analog signal, and sending the second analog signal; receiving the second analog signal, and performing the first processing on the second analog signal to generate a second digital signal, the second digital signal being identical to the first digital signal; obtaining a first processing time period T1, the first processing time period T1 being a difference between a time point when the second digital signal is obtained and a time point when the second analog signal is sent, and determining that the circuit delay is the first processing time period T1.

According to another aspect of the present disclosure, a circuit delay self-measurement device is provided, including: a receiving module, configured to receive a first analog signal; a first processing module, configured to perform a first processing on the first analog signal to generate a first digital signal; a digital signal obtaining module, configured to obtain the first digital signal; a second processing module, configured to perform a second processing on the first digital signal to generate a second analog signal; a sending module, configured to send the second analog signal. The receiving module is further configured to receive the second analog signal; in which, the first processing module is further configured to perform the first processing on the second analog signal to generate a second digital signal, the second digital signal being identical to the first digital signal; the digital signal obtaining module is further configured to obtain the second digital signal; a processing time obtaining module configured to obtain a first processing time period T1, the first processing time period T1 being a difference between a time point when the second digital signal is obtained and a time point when the second analog signal is sent; and a determining module, configured to determine that the circuit delay of the first processing module is the first processing time period T1.

According to another aspect of the present disclosure, a circuit delay self-measurement system is provided, including: the circuit delay self-measurement device and the response device according to the claims. The response device is further configured to receive a third analog signal, and perform a third processing on the third analog signal to generate the first analog signal. The response device is configured to send the first analog signal to the circuit delay self-measurement device. The response device is further configured to obtain a third processing time period T3, the third processing time period T3 being a time difference between a time point when the response device sends the first analog signal to the circuit delay self-measurement device and a time point when the response device receives the third analog signal. The preset value is greater than the third processing time period T3.

In another aspect, the present disclosure provides a circuit delay self-measurement device, including: a main control chip, a first communication interface, a first switch module and a receiving circuit module, in which the main control chip includes at least a first signal output end and a signal input end; the first switch module includes a first stationary end, a first connection end and a second connection end; the first stationary end is electrically connected to the receiving circuit module; the first connection end is electrically connected to the first communication interface; the second connection end is electrically connected to the first signal output end; the first communication interface is configured to receive a first analog signal when a path between the first stationary end and the first connection end is turned on, and to send the first analog signal to the receiving circuit module; the receiving circuit module is configured to receive the first analog signal, to perform a first processing on the first analog signal to generate a first digital signal, and to send the first digital signal to the signal input end of the main control chip; the main control chip is configured to receive the first digital signal, and to perform a second processing on the first digital signal to generate a second analog signal; the first switch module is configured to, when the main control chip completes receiving the first digital signal, turn off the path between the first stationary end and the first connection end and to turn on a path between the first stationary end and the second connection end; the main control chip is further configured to send the second analog signal to the receiving circuit module through the first signal output end, when the path between the first stationary end and the second connection end is turned on; the receiving circuit module is further configured to receive the second analog signal and to perform the first processing on the second analog signal to generate a second digital signal, the second digital signal being identical to the first digital signal; and the main control chip is further configured to receive the second digital signal, and to obtain a first processing time period T1, the first processing time period T1 being a difference between a time point when the second digital signal is obtained and a time point when the second analog signal is sent, and to determine that the circuit delay of the receiving circuit module is the first processing time period T1.

In another aspect, the present disclosure provides another circuit delay self-measurement device including: a main control chip, a first communication interface, a first switch module, a receiving circuit module and a modulation module, in which the main control chip includes at least a first signal output end and a signal input end; the first switch module includes a first stationary end, a first connection end and a second connection end; the modulation module includes at least a modulation signal input end and a modulated signal output end; the modulation signal input end is electrically connected to the first signal output end; the first stationary end is electrically connected to the receiving circuit module; the first connection end is electrically connected to the first communication interface; the second connection end is electrically connected to the modulated signal output end; the first communication interface is configured to receive a first analog signal when a path between the first stationary end and the first connection end is turned on, and to send the first analog signal to the receiving circuit module; the receiving circuit module is configured to receive the first analog signal, to perform a first processing on the first analog signal to generate a first digital signal, and to send the first digital signal to the signal input end of the main control chip; the main control chip is configured to receive the first digital signal, and to send the first digital signal to the modulation module; the first switch module is configured to, when the main control chip completes receiving the first digital signal, turn off the path between the first stationary end and the first connection end, and to turn on a path between the first stationary end and the second connection end; the modulation module is configured to receive the first digital signal, and to modulate the first digital signal to generate a second analog signal, and to send the second analog signal to the receiving circuit module through the modulated signal output end; the receiving circuit module is further configured to receive the second analog signal and to perform the first processing on the second analog signal to generate a second digital signal, the second digital signal being identical to the first digital signal; and the main control chip is further configured to receive the second digital signal, to obtain a first processing time period T1, the first processing time period T1 being a difference between a time point when the second digital signal is received and a time point when the first digital signal is sent, and to determine that the circuit delay of the receiving circuit module is the first processing time period T1.

According to another aspect of the present disclosure, a circuit delay self-measurement system is provided, including: above the circuit delay self-measurement device and the response device; the response device, configured to receive a fourth analog signal, to perform a fourth processing on the fourth analog signal to generate the first analog signal, and to send the first analog signal to the first communication interface of the circuit delay self-measurement device.

BRIEF DESCRIPTION OF THE DRAWINGS

In order to clearly illustrate technical solutions of embodiments of the present disclosure, a brief description of drawings used in the embodiments is given below. Obviously, the drawings in the following descriptions are only part embodiments of the present disclosure, and for those skilled in the art, other drawings can be obtained according to these drawings without creative labor.

DETAILED DESCRIPTION

The technical solutions in the embodiments of the present disclosure are clearly and completely described in the following with reference to the accompanying drawings in the embodiments of the present disclosure. Obviously, the embodiments described here are only part of the embodiments of the present disclosure and are not all embodiments of the present disclosure. Based on the embodiments of the present disclosure, other embodiments obtained by those skilled in the art without creative labor are within scope of the present disclosure.

Figure 1:
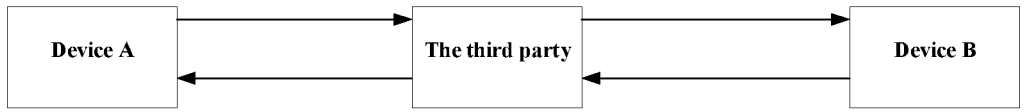
FIG. 1 is a schematic diagram illustrating a system when communication data between device A and device B is hijacked by a third party in the background of the present disclosure.

At present, the near field communication method is widely adopted in various fields (e.g. payment), and the communication between device A and device B that uses the near field communication method (e.g. RFID, NFC, infrared or Bluetooth) may have safety hazards. For example, as illustrated in FIG. 1, if the data channel established by device A and device B is intervened by a third party, the data during the entire communication process arrives at the other device through a third party without the knowledge of both rightful parties, eventually resulting in data leakage.

At present, the following method can be used to determine if the communication data between device A and device B is hijacked. After device A sends a command signal to device B, device A waits to receive a response signal from device B, the waiting time period refers to a difference between the time point when device A sends the command signal and the time point when the response signal from device B is received, and the communication data between device A and device B is considered not to be hijacked by the third party as long as the waiting time period is within a preset time period.

Figure 2:
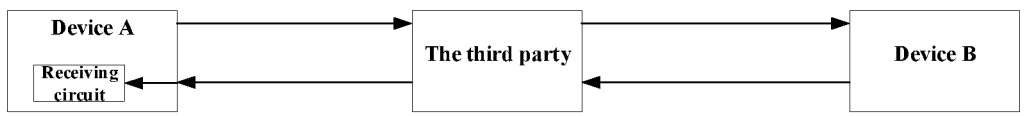
FIG. 2 is a schematic diagram illustrating structure of a system when communication data between device A with a circuit delay and device B is hijacked by a third party in the background of the present disclosure.

However, the response signal received by device A from device B is an analog signal, that is, the analog signal obtained by device A is a modulated response signal based on the response data. After receiving the response signal, device A, as illustrated in FIG. 2, first demodulates the signal obtained by the receiving circuit and generates the response data, but the low-pass filter in the receiving circuit for removing high-frequency signal components causes circuit delay, which is un-ignorable for the waiting time period. Since the response data obtained by device A is processed by the main control chip in device A, device A can obtain an accurate time point when the response data is received by the main control chip. In view of the circuit delay in the receiving circuit, the time point when the response signal is received by device A is not considered as the time point of obtaining the response data, thus device A still cannot obtain the accurate time point when the response signal is received. In order to accurately measure the waiting time period of device A, a method of measuring the circuit delay of the receiving circuit is urgently required.

Thus, the present disclosure provides a circuit delay self-measurement method, device and system.

Embodiments of the present disclosure will be described in detail below with reference to the accompanying drawings.

Embodiment 1

Figure 3:
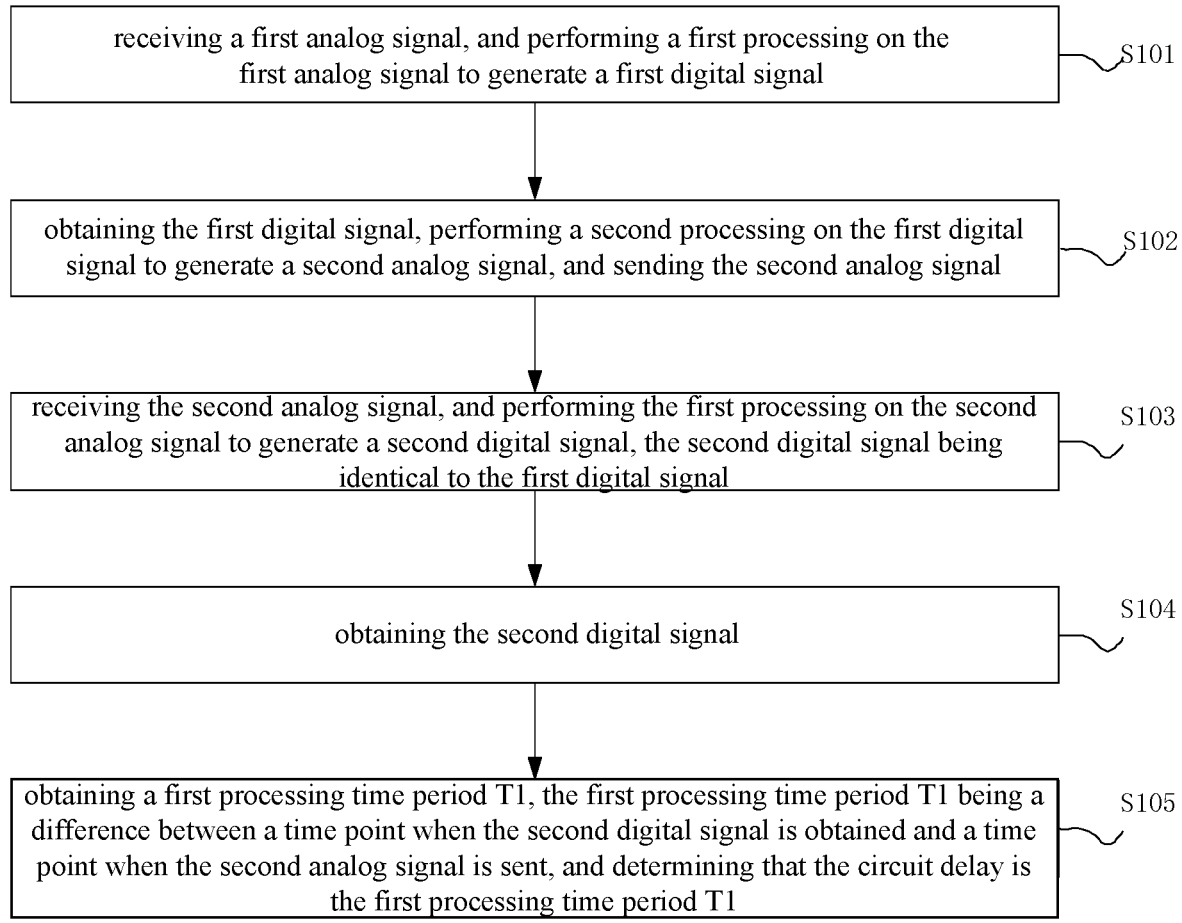
FIG. 3 is a flowchart of a circuit delay self-measurement method according to embodiment 1 of the present disclosure.

The embodiment provides a circuit delay self-measurement method. FIG. 3 is a flowchart of a circuit delay self-measurement method according to embodiment 1 of the present disclosure. As illustrated in FIG. 3, the method includes the following actions (S101-S105):

At block S101, a first analog signal is received, and a first processing is performed on the first analog signal to generate a first digital signal.

An executing subject of this embodiment may be a circuit delay self-measurement device, such as a card reader, a smart card, and the like. The circuit delay self-measurement device in this embodiment includes a receiving circuit that realizes a demodulation function, and a circuit delay is caused when the receiving circuit demodulates a received modulated signal.

The circuit delay self-measurement device in the embodiment receives the first analog signal. The first analog signal received by the circuit delay self-measurement device is sent by a response device. A communication manner between the circuit delay self-measurement device and the response device may be RFID, NFC, infrared or Bluetooth. The circuit delay self-measurement device may receive the first analog signal sent by the response device through a communication interface (e.g. an antenna).

In this embodiment, the receiving circuit in the circuit delay self-measurement device performs the first processing on the first analog signal to generate the first digital signal. Performing the first processing on the first analog signal to generate the first digital signal includes followings. The first analog signal is demodulated to generate the first digital signal. Consequently, the receiving circuit is a circuit that realizes the demodulation function. The receiving circuit realizing the demodulation function has a low-pass filter. The circuit delay is caused when a signal passes through the low-pass filter in the receiving circuit, and the circuit delay cannot be ignored. The circuit delay detected in the present disclosure is the circuit delay of the receiving circuit that realizes the demodulation function.

At block S102, the first digital signal is obtained, a second processing is performed on the first digital signal to generate a second analog signal, and the second analog signal is sent.

In this embodiment, although it can be understood that the circuit delay of the circuit delay self-measurement device is a circuit delay caused by the receiving circuit in a process of demodulating the first analog signal to generate the first digital signal, the circuit delay self-measurement device cannot accurately determine a time point when the first analog signal is received, thus the circuit delay caused by the receiving circuit in the process of demodulating the first analog signal to generate the first digital signal cannot be accurately detected. In order to determine the time point when the analog signal is received by the receiving circuit, the circuit delay self-measurement device performs a second processing on the obtained first digital signal to generate a second analog signal and sends the second analog signal to the receiving circuit. In this way, since the second analog signal is sent by itself, the circuit delay of the receiving circuit in the circuit delay self-measurement device can be determined by determining a time point when the second analog signal is sent.

In this embodiment, performing the second processing on the first digital signal to generate the second analog signal includes performing first modulation on the first digital signal to generate the second analog signal. Specifically, after the circuit delay self-measurement device demodulates the first analog signal to generate the first digital signal, the circuit delay self-measurement device obtains the first digital signal, and performs the first modulation on the first digital signal to generate the second analog signal. A modulation mode of the first modulation is not specifically limited in this embodiment, which may be, for example, amplitude modulation, phase modulation or frequency modulation.

In this embodiment, after the circuit delay self-measurement device generates the second analog signal by demodulation, the second analog signal is sent. A manner in which the second analog signal is sent may be, for example, through physical connection lines (e.g. wires) or a communication interface (e.g. an antenna), which is not specifically limited.

At block S103, the second analog signal is received, and the first processing is performed on the second analog signal to generate a second digital signal. The second digital signal is identical to the first digital signal.

In this embodiment, performing the first processing on the second analog signal to generate the second digital signal includes demodulating the second analog signal to generate the second digital signal. In detail, the circuit delay self-measurement device receives the second analog signal sent by itself. The receiving circuit in the circuit delay self-measurement device demodulates the second analog signal to generate the second digital signal. Since the second analog signal is generated by performing the first modulation on the first digital signal, the second digital signal generated by demodulating the second analog signal is identical to the first digital signal, and a time period the circuit delay self-measurement device spends on performing the first processing on the second analog signal to generate the second digital signal is identical to a time period spent on performing the first processing on the first analog signal to generate the first digital signal. The circuit delay self-measurement device may determine the circuit delay of the circuit delay self-measurement device in the process of performing the first processing on the first analog signal to generate the first digital signal by sending the second analog signal by itself, and performs the first processing on the second analog signal to generate the second digital signal.

At block S104, the second digital signal is obtained.

In this embodiment, after demodulating the second analog signal to generate the second digital signal, the circuit delay self-measurement device obtains the second digital signal.

At block S105, a first processing time period T1 is obtained, the first processing time period T1 is a difference between a time point when the second digital signal is received and a time point when the second analog signal is sent, and it is determined that the circuit delay is the first processing time period T1.

In this embodiment, the first processing time period T1 is the difference between the time point when the second digital signal is obtained by the circuit delay self-measurement device and the time point when the second analog signal is sent by the circuit delay self-measurement device. The first processing time period T1 is the circuit delay caused by the receiving circuit in the circuit delay self-measurement device. The circuit delay self-measurement device obtains the first processing time period T1 and determines that the circuit delay is the first processing time period T1.

As an alternative implementation, the first processing time period T1 in this embodiment may be a difference between a time point when the second digital signal is started to be obtained and a time point when the second analog signal is started to be sent, a difference between the time point when the second digital signal is started to be obtained and a time point when sending the second analog signal is completed, a difference between a time point when obtaining the second digital signal is completed and the time point when the second analog signal is started to be sent, or may also be a difference between the time point when obtaining the second digital signal is completed and the time point when sending the second analog signal is completed. All of these implementations are deemed to be within the protection scope of the present disclosure.

In this embodiment, the manner in which the first processing time period T1 is obtained by the circuit delay self-measurement device is not specifically limited. In the following, an implementation of obtaining the first processing time period T1 is exemplarily given. The circuit delay self-measurement device starts timing at the time point when the second analog signal is sent, and obtains a value at the time point when the circuit delay self-measurement device obtains the second digital signal, and the value is the first processing time period T1.

The circuit delay self-measurement method provided in this embodiment can detect the circuit delay of the receiving circuit in the circuit delay self-measurement device.

Embodiment 2

Figure 4:
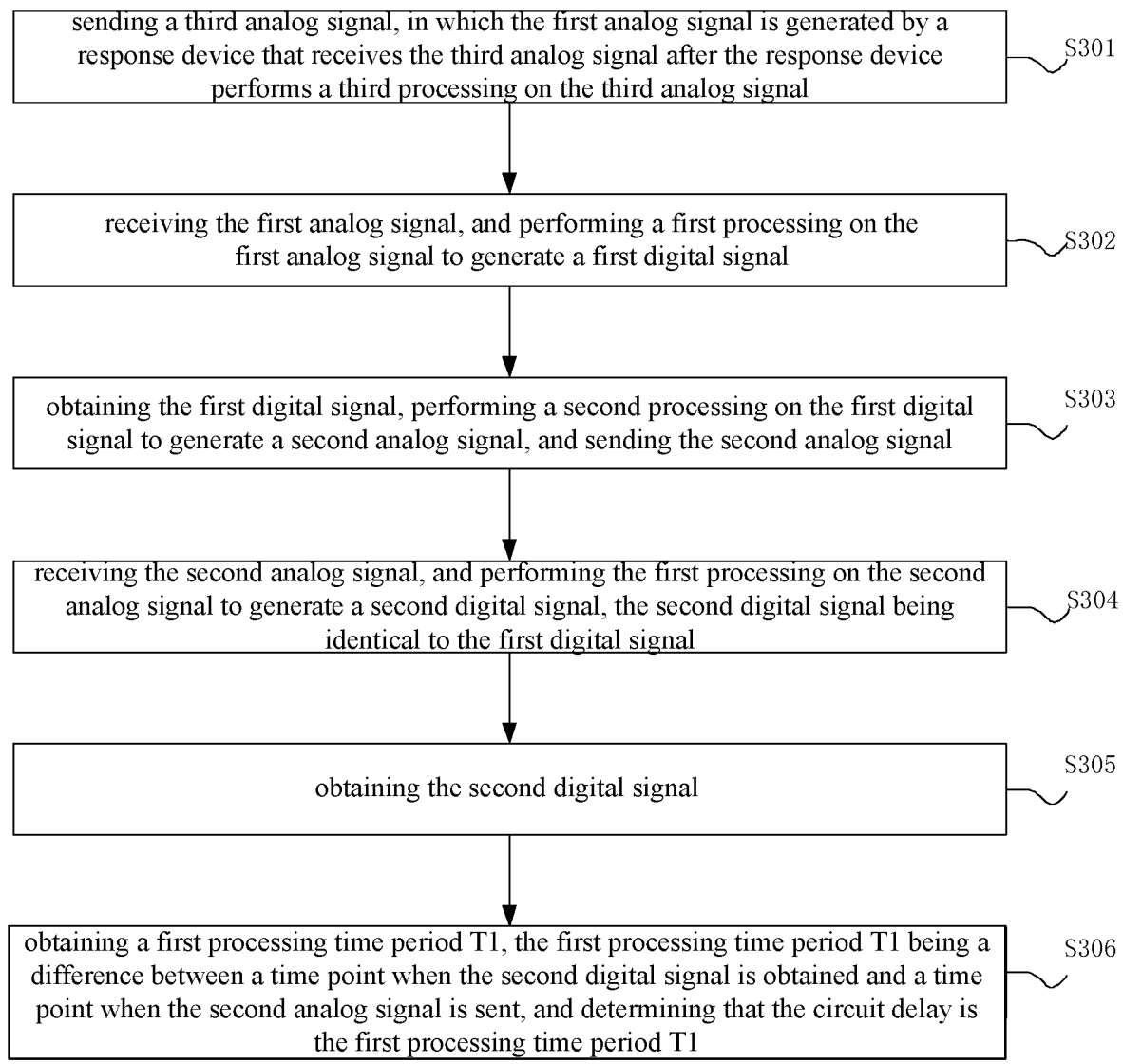
FIG. 4 is a flowchart of a circuit delay self-measurement method according to embodiment 2 of the present disclosure.

The embodiment provides a circuit delay self-measurement method. FIG. 4 is a flowchart of a circuit delay self-measurement method according to embodiment 2 of the present disclosure. As illustrated in FIG. 4, the method includes the following actions (S301-S306):

At block S301, the third analog signal is sent, in which the first analog signal is generated by a response device that receives the third analog signal after the response device performs a third processing on the third analog signal.

In this embodiment, the circuit delay self-measurement device sends the third analog signal, which is received by the response device. The methods of sending the third analog signal by the circuit delay self-measurement device may be RFID, NFC, infrared, Bluetooth or the like, which is not specifically limited in this embodiment. The circuit delay self-measurement device in the embodiment sends the third analog signal to the response device, and the circuit delay self-measurement device and the response device together form a communication system, so as to detect if the communication data between the circuit delay self-measurement device and the response device is hijacked.

In this embodiment, performing the third processing on the third analog signal by the response device that receives the third analog signal includes at least follows. The response device demodulates the third analog signal to generate the third digital signal. The response device responds according to the third digital signal to generate the first digital signal. The response device performs a second modulation on the first digital signal to generate the first analog signal, in which a modulation mode of the second modulation is same as a modulation mode of the first modulation. After performing the third processing on the third analog signal and generating the first analog signal, the response device sends the first analog signal as a response signal to the third analog signal.

Actions at block S302 to S306 are the same as actions at block S101 to S105, and are not repeatedly described herein.

With the circuit delay self-measurement method provided in the embodiment, the circuit delay of the receiving circuit in the circuit delay self-measurement device can be detected, and the circuit delay self-measurement device and the response device together form a communication system, such that it can be detected whether the communication data between the circuit delay self-measurement device and the response device is hijacked.

Embodiment 3

Figure 5:
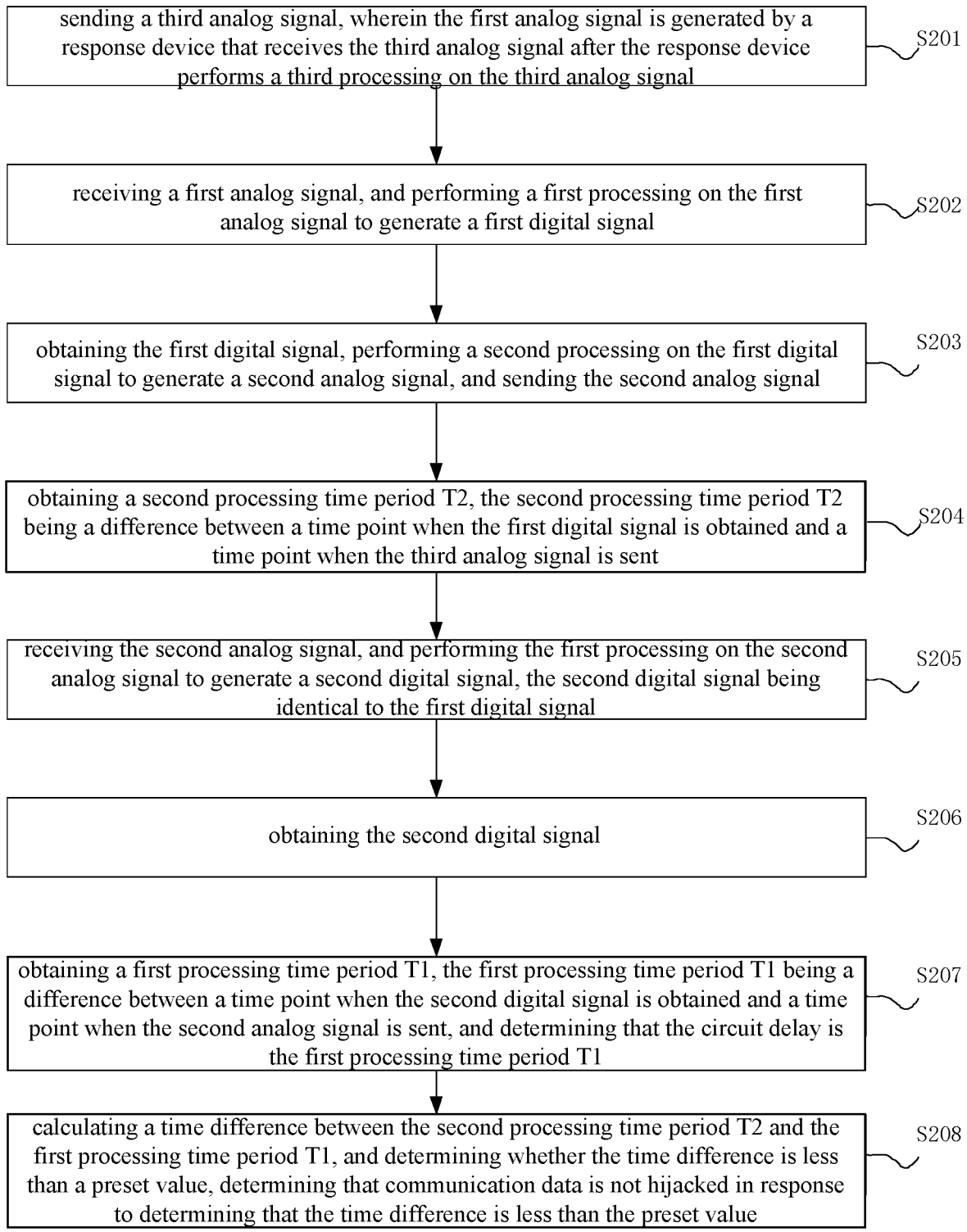
FIG. 5 is a flowchart of a circuit delay self-measurement method according to embodiment 3 of the present disclosure.

The embodiment provides a circuit delay self-measurement method. FIG. 5 is a flowchart of a circuit delay self-measurement method according to embodiment 3 of the present disclosure. As illustrated in FIG. 5, the method includes the following actions (S201-S208):

At block S201: a third analog signal is sent, in which the first analog signal is generated by a response device that receives the third analog signal after the response device performs a third processing on the third analog.

With the circuit delay self-measurement method provided in this embodiment, the circuit delay of the receiving circuit in the circuit delay self-measurement device can be detected, and it can also be determined if the communication data between the circuit delay self-measurement device and the response device is hijacked.

In this embodiment, in order to determine if the communication data between the circuit delay self-measurement device and the response device is hijacked, the circuit delay self-measurement device sends the third analog signal, which is received by the response device. The manner in which the third analog signal is sent by the circuit delay self-measurement device may be, for example, through RFID, NFC, infrared or Bluetooth, which is not specifically limited in this embodiment.

In this embodiment, performing the third processing on the third analog signal by the response device that receives the third analog signal includes at least follows. The response device demodulates the third analog signal to generate the third digital signal. The response device responds according to the third digital signal to generate the first digital signal. The response device performs a second modulation on the first digital signal to generate the first analog signal, in which a modulation mode of the second modulation is same as a modulation mode of the first modulation. After performing the third processing on the third analog signal and generating the first analog signal, the response device sends the first analog signal as a response signal to the third analog signal.

Action at block S202 is the same as the action at block S101 in Embodiment 1, and is not repeatedly described herein.

Action at block S203 is the same as the action at block S102 in Embodiment 1, and is not repeatedly described herein.

At block S204: the second processing time period T2 is obtained, the second processing time period T2 is a difference between a time point when the first digital signal is obtained and a time point when the third analog signal is sent.

In this embodiment, the second processing time period T2 is the difference between the time point when the first digital signal is obtained by the circuit delay self-measurement device and the time point when the third analog signal is sent by the circuit delay self-measurement device, and the total time from the transmission of the third analog signal to the receipt of the first digital signal by the circuit delay self-measurement device is the second processing time period T2.

In this embodiment, the second processing time period T2 may be a difference between a time point when the first digital signal is started to be obtained and a time point when the third analog signal is started to be sent, a difference between a time point when the first digital signal is completely obtained and the time point when the third analog signal is started to be sent, a difference between the time when the first digital signal is started to be obtained and a time point when the third analog signal is completely sent, or may also be the difference between the time when the first digital signal is completely obtained and the time when the third analog signal is completely sent, which is not limited in the embodiment.

In addition, since the first analog signal is generated by performing the first modulation on the first digital signal, the second analog signal is generated by performing the second modulation on the first digital signal, and in the case that the modulation mode of the first modulation is the same as that of the second modulation, the circuit delay of the receiving circuit in the circuit delay self-measurement device caused by demodulating the first analog signal is the same as the circuit delay caused by demodulating the second analog signal.

It should be noted that, as long as action S204 follows action S203 and is performed prior to step S208, the above actions are within the protection scope of the present disclosure.

Actions S205 to S207 are the same as actions S103 to S105 according to embodiment 1, and are not repeatedly described herein.

Action S208: a time difference between the second processing time period T2 and the first processing time period T1 is calculated, and it is determined whether the time difference is less than a preset value, if the time difference is less than the preset value, it is determined that the communication data is not hijacked.

In this embodiment, the total time from the transmission of the third analog signal to the reception of the first digital signal by the circuit delay self-measurement device is the second processing time period T2, and the circuit delay caused by the receiving circuit in the circuit delay self-measurement device is the first processing time period T1, the time period from the transmission of the third analog signal to the receipt of the first analog signal by the circuit delay self-measurement device is the time difference between the second processing time period T2 and the first processing time period T1. The circuit delay self-measurement device determines whether the time difference is less than the preset value, that is, the circuit delay self-measurement device determines if the time from the transmission of a command signal to the receipt of a response signal is less than the preset value, and if it is determined that the time difference is less than the preset value, the communication data between the circuit delay self-measurement device and the response device is not hijacked.

With the circuit delay self-measurement method provided by the embodiment, the circuit delay of the receiving circuit in the circuit delay self-measurement device can be detected, and it can also be determined if the communication data between the circuit delay self-measurement device and the response device is hijacked.

Embodiment 4

Figure 6:
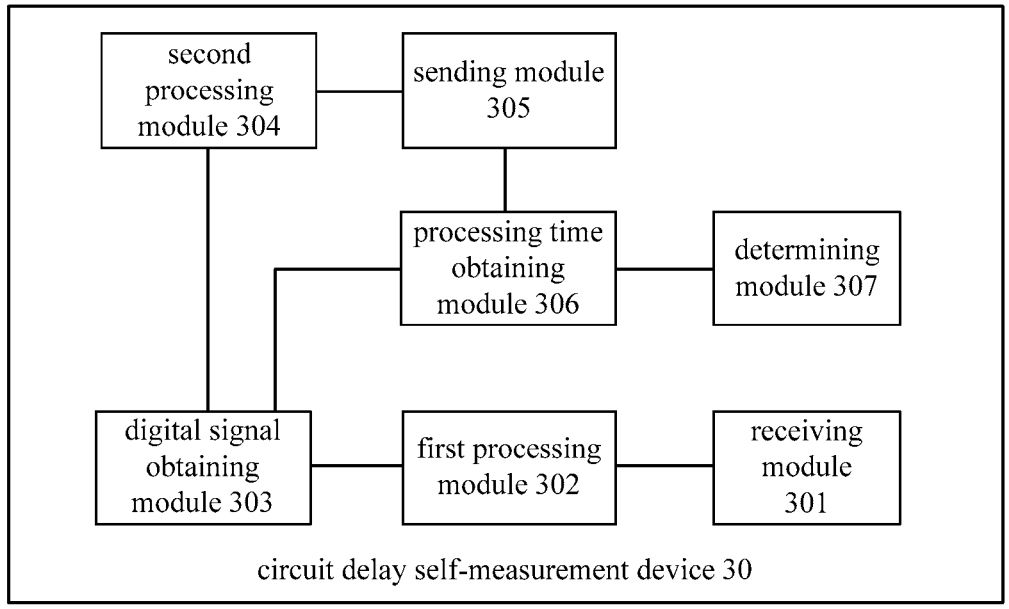
FIG. 6 is a diagram of a circuit delay self-measurement device according to embodiment 4 of the present disclosure.

The present embodiment provides a circuit delay self-measurement device 30. As illustrated in FIG. 6, the device includes: a receiving module 301, configured to receive a first analog signal; a first processing module 302, configured to perform a first processing on the first analog signal to generate a first digital signal; a digital signal obtaining module 303, configured to obtain the first digital signal; a second processing module 304, configured to perform a second processing on the first digital signal to generate a second analog signal; a sending module 305, configured to send the second analog signal; in which, the receiving module 301 is further configured to receive the second analog signal, the first processing module 302 is further configured to perform the first processing on the second analog signal to generate a second digital signal, the second digital signal is identical to the first digital signal, the digital signal obtaining module 303 is further configured to obtain the second digital signal; a processing time obtaining module 306, configured to obtain a first processing time period T1, the first processing time period T1 being a difference between a time point when the second digital signal is obtained and a time point when the second analog signal is sent; and a determining module 307, configured to determine that the circuit delay of the first processing module 302 is the first processing time period T1.

In this embodiment, the first analog signal obtained by the receiving module 301 is sent by a response device, and a communication mode between the circuit delay self-measurement device 30 and the response device may be RFID, NFC, infrared, Bluetooth, or the like. The receiving module 301 may be a communication interface (e.g. an antenna), or a physical connection line (e.g. wire), which is not specifically limited in this embodiment.

In this embodiment, the first processing module 302 performs the first processing on the first analog signal to generate the first digital signal. The first processing module 302 includes at least: a demodulation unit, configured to demodulate the first analog signal to generate the first digital signal. Consequently, the first processing module 302 is a module that realizes a demodulation function, and a low-pass filter exists in the first processing module 302 that implements a demodulation function. When a signal passes through the low-pass filter, the circuit delay is caused and cannot be ignored. In the present disclosure, the detected circuit delay is the circuit delay of the first processing module 302 that implements the demodulation function.

In this embodiment, although it can be understood that the circuit delay of the circuit delay self-measurement device 30 is a circuit delay caused by the first processing module 302 in a process of demodulating the first digital signal to generate the first digital signal, the processing time obtaining module 306 cannot accurately determine a time point when the first analog signal is received. Therefore, the circuit delay caused by the first processing module 302 in the process of demodulating the first digital signal to generate the first analog signal cannot be accurately detected. In order to determine the time point when the receiving circuit receives the analog signal, the second processing module 304 in the circuit delay self-measurement device 30 performs the second processing on the first digital signal obtained by the digital signal obtaining module 303 to generate the second analog signal, and sends the second analog signal to the receiving module 301. Thus, since the second analog signal is sent by the sending module 305 of the circuit delay self-measurement device 30, the processing time obtaining module 306 can determine the time point when the second analog signal is sent, thus the circuit delay caused by the first processing module 302 in the circuit delay self-measurement device 30 can be determined. In this embodiment, the second processing module 304 performs the second processing on the first digital signal to generate the second analog signal. In detail, after the first processing module 302 demodulates the first analog signal and generates the first digital signal, the digital signal obtaining module 303 obtains the first digital signal, and the second processing module 304 modulates the first digital signal obtained by the digital signal obtaining module 303 and generates the second analog signal. A modulation mode of the first modulation is not specifically limited in this embodiment, which may be, for example, amplitude modulation, phase modulation, or frequency modulation.

In this embodiment, after the second processing module 304 generates the second analog signal through the modulation, the sending module 305 sends the second analog signal to the receiving circuit. A manner in which the sending module 305 sends the second analog signal is not specifically limited. For example, the second analog signal can be directly sent through physical connection lines (e.g., wires) to the receiving module 301, or the second analog signal can be sent through a communication interface (e.g., an antenna), then the receiving module 301 receives the second analog signal.

In this embodiment, the demodulation unit in the first processing module 302 is further configured to demodulate the second analog signal to generate the second digital signal. In detail, the receiving module 301 receives the second analog signal sent by itself, and the first processing module 302 demodulates the second analog signal to generate the second digital signal. Because the second analog signal is generated by performing the first modulation on the first digital signal, the second digital signal generated by demodulating the second analog signal is identical to the first digital signal.

In this embodiment, after the first processing module 302 performs the second processing on the second analog signal to generate the second digital signal, the digital signal obtaining module 303 obtains the second digital signal. The first processing time period T1 is a difference between a time point when the digital signal obtaining module 303 obtains the second digital signal and a time point when the sending module 305 sends the second analog signal, and the circuit delay caused by the first processing module 302 in the circuit delay self-measurement device 30 is the first processing time period T1. The processing time obtaining module 306 obtains the first processing time period T1, and the determining module 307 determines that the circuit delay is the first processing time period T1.

As an alternative implementation, the first processing time period T1 in this embodiment may be a difference between a time point when the digital signal obtaining module 303 starts to obtain the second digital signal and a time point when the sending module 305 starts to send the second analog signal. The value may also be a difference between the time point when the digital signal obtaining module 303 starts to obtain the second digital signal and a time point when the sending module 305 completes sending the second analog signal, or a difference between a time point when the digital signal obtaining module 303 completes obtaining the second digital signal and the time point when the sending module 305 starts sending the second analog signal. Certainly, the value may also be a difference between the time point when the digital signal obtaining module 303 completes obtaining the second digital signal and the time point when the sending module 305 completes sending the second analog signal. The above embodiments are all within the protection scope of the present disclosure.

In this embodiment, a manner in which the processing time obtaining module 306 obtains the first processing time period T1 is not specifically limited An implementation for the processing time obtaining module 306 to obtain the first processing time period T1 is exemplarily given in the following. The processing time obtaining module 306 starts timing when the sending module 305 sends the second analog signal, and obtains a value reached when the digital signal obtaining module 303 obtains the second digital signal. The value is the first processing time period T1.

Figure 7:
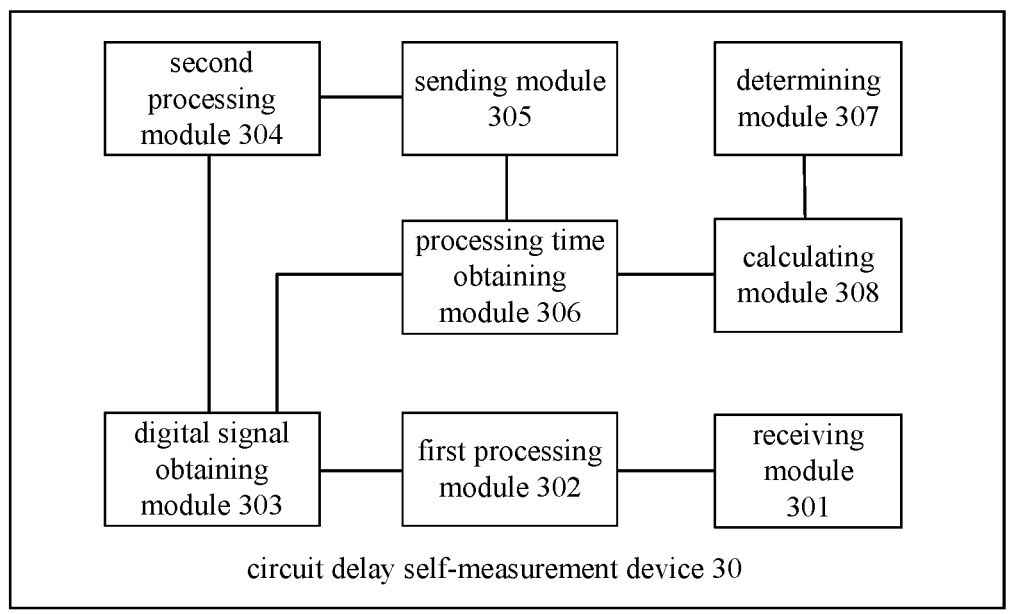
FIG. 7 is a block diagram of another circuit delay self-measurement device according to embodiment 4 of the present disclosure.

In addition, as an alternative implementation of this embodiment, as illustrated in FIG. 7, the circuit delay self-measurement device 30 further includes a calculating module 308 and a judging module. The sending module 305 is further configured to send the third analog signal. The first analog signal received by the receiving module 301 is generated by a response device that receives the third analog signal after the response device performs a third processing on the third analog signal. The processing time obtaining module 306 is further configured to obtain a second processing time period T2. The second processing time period T2 is a difference between a time point when the first digital signal is obtained and a time point when the third analog signal is sent. The calculating module 308 is configured to calculate a time difference between the second processing time period T2 and the first processing time period T1. The judging module is configured to determine whether the time difference is less than a preset value. The determining module 307 is further configured to determine that communication data between the circuit delay self-measurement device 30 and the response device is not hijacked if the time difference is less than the preset value.

As an alternative implementation of this embodiment, in order to detect whether the communication data between the circuit delay self-measurement device 30 and the response device is hijacked, the sending module 305 firstly sends the third analog signal, then the response device receives the third analog signal. A manner in which the sending module 305 sends the third analog signal is not specifically limited. For example, the sending module 305 may send the third analog signal through RFID, NFC, infrared, Bluetooth, or the like.

As an alternative implementation of this embodiment, the second processing time period T2 may be a difference between a time point when the digital signal obtaining module 303 starts to obtain the first digital signal and a time point when the sending module 305 starts to send the third analog signal. The second processing time period T2 may also be a difference between the time point when the digital signal obtaining module 303 starts to obtain the first digital signal and a time point when the sending module 305 completes sending the third analog signal, or may be a difference between a time point when the digital signal obtaining module 303 completes receiving the first digital signal and the time point when the sending module 305 starts to send the third analog signal. Certainly, the second processing time period T2 may also be a difference between the time point when the digital signal obtaining module 303 completes receiving the first digital signal and the time point when the sending module 305 completes sending the third analog signal. Total time from the time when the sending module 305 in the circuit delay self-measurement device 30 sends the third analog signal to the time when the digital signal obtaining module 303 obtains the first digital signal is the second processing time period T2.

In addition, since the first analog signal is generated by performing the first modulation on the first digital signal, the second analog signal is generated by performing the second modulation on the first digital signal, and in the case that a modulation mode of the first modulation is the same as that of the second modulation, the circuit delay of processing the first analog signal by the first processing module 302 is the same as the circuit delay of processing the second analog signal, thus the circuit delay caused by the first processing module 302 to process the first analog signal to obtain the first digital signal is the first processing time period T1. The time difference between the second processing time period T2 and the first processing time period T1 is the difference between the time point when the sending module 305 sends the third analog signal and the time point when the first analog signal is received. The judging module in the circuit delay self-measurement device 30 determines whether the time difference is less than the preset value. That is, the judging module in the circuit delay self-measurement device 30 determines whether the time period from the time when a command signal is sent to the time when a response signal is received is less than a preset value. If the judging module determines that the time difference is less than the preset value, the determining module 307 determines the communication data between the circuit delay self-measurement device 30 and the response device is not hijacked.

With the circuit delay self-measurement device 30 provided by the embodiment, the circuit delay of the first processing module 302 that implements the demodulation function in the circuit delay self-measurement device 30 may be detected, and it may also determine whether the communication data between the circuit delay self-measurement device 30 and the response device is hijacked.

Embodiment 5

Figure 8:
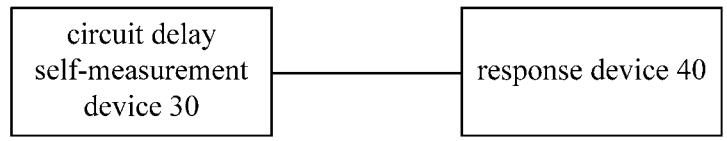
FIG. 8 is a block diagram of a circuit delay self-measurement system according to embodiment 5 of the present disclosure.

This embodiment provides a circuit delay self-measurement system. As illustrated in FIG. 8, the system includes a circuit delay self-measurement device 30 and a response device 40.

The circuit delay self-measurement device 30 in the embodiment is identical to the circuit delay self-measurement device 30 in embodiment 3, which will not be repeatedly described herein.

In this embodiment, after the sending module in the circuit delay self-measurement device 30 sends the third analog signal, the response device 40 receives the third analog signal, and performs a third processing on the third analog signal to generate the first analog signal. Performing the third processing on the third analog signal by the response device 40 at least includes follows. The response device 40 demodulates the third analog signal to generate the third digital signal, the first digital signal is generated by responding according to the third digital signal, and the second modulation is performed on the first digital signal to generate the first analog signal. A modulation mode of the first modulation is the same as that of the second modulation.

In this embodiment, after the response device 40 generates the first analog signal, the first analog signal is sent to the circuit delay self-measurement device 30. A manner in which the response device 40 sends the first analog signal to the circuit delay self-measurement device 30 is not specifically limited in this embodiment. For example, the response device 40 may send the first analog signal to the circuit delay self-measurement device 30 by means of RFID, NFC, infrared, Bluetooth, or the like.

In the embodiment, the response device 40 is further configured to obtain a third processing time period T3. The third processing time period T3 is a difference between a time point when the response device 40 sends the first analog signal to the circuit delay self-measurement device 30 and a time point when the response device 40 receives the third analog signal. In detail, the third processing time period T3 represents a time period required for the response device 40 from receiving the third analog signal to sending the first analog signal. The transmission time of the signal between the response device 40 and the circuit delay self-measurement device 30 can be ignored in a case that the above two devices are close to each other. Thus the difference between the time point when the third analog signal is sent by the circuit delay self-measurement device 30 and the time point when the first analog signal is obtained (i.e., the time difference between the second processing time period T2 and the first processing time period T1) is the same as the third processing time period T3. The circuit delay self-measurement device 30 determines whether the time difference between the second processing time period T2 and the first processing time period T1 is less than a preset value, in which the preset value is greater than the third processing time period T3, and if the time difference is less than the preset value, it is determined that the communication data between the circuit delay self-measurement device 30 and the response device 40 is not hijacked.

It should be noted that, in order to ensure the accuracy of determining whether the communication data is hijacked, the preset value should be greater than the third processing time period T3 and a difference between the preset value and the third processing time period T3 may not be too large.

With the circuit delay self-measurement system provided by the embodiment, the circuit delay of the first processing module that implements the demodulation function in the circuit delay self-measurement device may be detected, and it may also determine whether the communication data between the circuit delay self-measurement device 30 and the response device 40 is hijacked.

Embodiment 6

Figure 9:
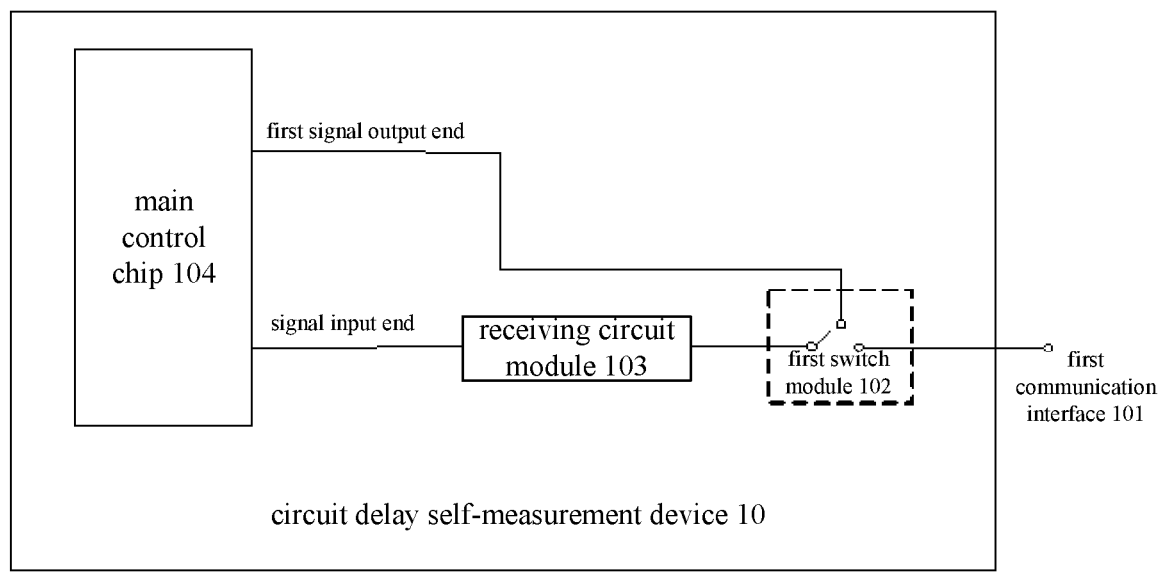
FIG. 9 is a block diagram of a circuit delay self-measurement device according to embodiment 6 of the present disclosure.
Figure 10:
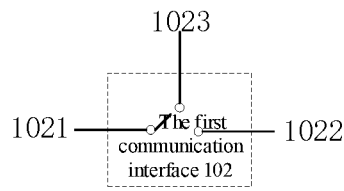
FIG. 10 is a block diagram of a first switch module according to embodiment 6 of the present disclosure.

The embodiment provides a circuit delay self-measurement device 10. As illustrated in FIG. 9 and FIG. 10, the circuit delay self-measurement device 10 includes: a main control chip 104, a first communication interface 101, a first switch module 102, and a receiving circuit module 103. The main control chip 104 includes at least a first signal output end and a signal input end. The first switch module 102 includes a first stationary end 1021, a first connection end 1022 and a second connection end 1023. The first stationary end 1021 is electrically connected to the receiving circuit module 103. The first connection end 1022 is electrically connected to the first communication interface 101. The second connection end 1023 is electrically connected to the first signal output end. The first communication interface 101 is configured to receive a first analog signal when a path between the first stationary end 1021 and the first connection end 1022 is turned on, and to send the first analog signal to the receiving circuit module 103. The receiving circuit module 103 is configured to receive the first analog signal, to perform a first processing on the first analog signal to generate a first digital signal, and to send the first digital signal to the signal input end of the main control chip 104. The main control chip 104 is configured to receive the first digital signal, and to perform a second processing on the first digital signal to generate a second analog signal. The first switch module 102 is configured to, when the main control chip 104 completes receiving the first digital signal, turn off the path between the first stationary end 1021 and the first connection end 1022 and to turn on a path between the first stationary end 1021 and the second connection end 1023. The main control chip 104 is further configured to send the second analog signal to the receiving circuit module 103 through the first signal output end when the path between the first stationary end 1021 and the second connection end 1023 is turned on. The receiving circuit module 103 is further configured to receive the second analog signal and to perform the first processing on the second analog signal to generate a second digital signal, where the second digital signal is identical to the first digital signal. The main control chip 104 is further configured to receive the second digital signal, and to obtain a first processing time period T1, which is a difference between a time point when the second digital signal is obtained and a time point when the second analog signal is sent, and to determine that the circuit delay of the receiving circuit module 103 is the first processing time period T1.

In this embodiment, the circuit delay self-measurement device 10 may be a card reader, a smart card, or the like, which is not specifically limited in this embodiment.

In this embodiment, the first communication interface 101 may be a wired communication interface (e.g. a USB interface or an audio interface), or may be a wireless communication interface (e.g. an antenna), which is not specifically limited in this embodiment.

In this embodiment, as illustrated in FIG. 10, the first switch module 102 is a three-end component, in which one end is the first stationary end 1021, and the other two ends are the first connection end 1022 and the second connection end 1023. The first stationary end 1021 is electrically connected to the receiving circuit module 103. The first connection end 1022 is electrically connected to the first communication interface 101, and the second connection end 1023 is electrically connected to the first signal output end of the main control chip 104. The first switch module 102 is configured to turn on or turn off a path between the first stationary end 1021 and the first connection end 1022, or turn on or turn off a path between the first stationary end 1021 and the second connection end 1023. When the path between the first stationary end 1021 and the first connection end 1022 is turned on, the first communication interface 101 receives the first analog signal, and sends the first analog signal to the receiving circuit module 103. The first switch module 102 in this embodiment may be a physical switch or a virtual switch, as long as the switch that is capable to realize the above functions is within the protection scope of the present disclosure.

As an alternative implementation of this embodiment, performing the first processing on the first analog signal to generate the first digital signal includes demodulating the first analog signal to generate the first digital signal. In detail, after receiving the first analog signal, the receiving circuit module 103 demodulates the obtained first analog signal to generate the first digital signal, and sends the first digital signal to the signal input end of the main control chip 104. It can be seen that the receiving circuit module 103 is a circuit configured to realize demodulation function. A low-pass filter for realizing the demodulation function exists in the receiving circuit module 103. The circuit delay is caused when a signal passes through the low-pass filter, and the circuit delay cannot be ignored. The circuit delay in the present disclosure is the circuit delay of the receiving circuit module 103 that implements the demodulation function.

In this embodiment, in order to allow the main control chip 104 to send the generated second analog signal to the receiving circuit module 103, the first switch module 102 turns off the path between the first stationary end 1021 and the first connection end 1022 when the main control chip 104 completes receiving the first digital signal, and turns on the path between the first stationary end 1021 and the second connection end 1023. Thus, the main control chip 104 may send the second analog signal to the receiving circuit module 103 through the first signal output end, and the first communication interface 101 is prevented from receiving an external signal which may cause interference to the second analog signal.

As an alternative implementation of the embodiment, the main control chip 104 further includes a control end. The control end is electrically connected to the first switch module 102. The main control chip 104 is configured to send a control signal to the control end when the first digital signal is received. The control end is configured to control the first switch module 102 to turn off the path between the first stationary end 1021 and the first connection end 1022 after receiving the control signal, and to control the first switch module 102 to turn on the path between the first stationary end 1021 and the second connection end 1023. The main control chip 104 in this embodiment controls the first switch module 102 to turn on or turn off through the control end, thereby realizing automatic control of the first switch module 102.

In the present embodiment, although it can be understood that the circuit delay of the circuit delay self-measurement device is caused by the receiving circuit module 103 in the process of demodulating the first analog signal to generate the first digital signal, the main control chip 104 cannot accurately determine the time when the first analog signal is received, Therefore, the circuit delay caused by the receiving circuit module 103 in the process of demodulating the first analog signal to generate the first digital signal cannot be accurately detected. To determine the time when the receiving circuit receives the analog signal, the main control chip 104 performs the second processing on the obtained first digital signal to generate the second analog signal, and sends the second analog signal to the receiving circuit module 103. Thus the second analog signal is sent by the main control chip 104, and the main control chip 104 can determine the time point when the second analog signal is sent (i.e., the time point when the receiving circuit module 103 receives the second analog signal). In addition, the main control chip 104 can determine the time point when the second digital signal is received (i.e., the time point when the receiving circuit module 103 finishes performing the first processing on the second analog signal), the main control chip 104 can determine the circuit delay of the receiving circuit module 103 in the circuit delay self-measurement device 10.

As an alternative implementation of this embodiment, performing the second processing on the first digital signal to generate the second analog signal includes performing a first modulation on the first digital signal to generate the second analog signal. In detail, the main control chip 104 receives the first digital signal, and performs the first modulation on the first digital signal to generate the second analog signal. A modulation mode of the first modulation is not specifically limited in this embodiment, which may be, for example, amplitude modulation, phase modulation or frequency modulation.

In this embodiment, performing the first processing on the second analog signal to generate the second digital signal includes demodulating the second analog signal to generate the second digital signal. The main control chip 104 receives the second digital signal. In detail, after receiving the second analog signal sent by the main control chip 104, the receiving circuit module 103 demodulates the second analog signal to generate the second digital signal. Because the second analog signal is generated by performing the first modulation on the first digital signal, the second digital signal generated by demodulating the second analog signal is the same as the first digital signal, and the time that the receiving circuit module 103 spends on performing the first processing on the second analog signal to generate the second digital signal is the same as the time that the receiving circuit module 103 spends on performing the first processing on the first analog signal to generate the first digital signal. The circuit delay self-measurement device 10 sends the second analog signal through the main control chip 104, and the second digital signal is generated by performing the first processing on the received second analog signal by the receiving circuit module 103, thus the circuit delay of the receiving circuit module 103 in performing the first processing on the first analog signal to generate the first digital signal can be determined.

As an alternative implementation, the first processing time period T1 may be a difference between a time point when the second digital signal is started to be received and a time point when sending the second analog signal is completed, or a difference between the time point when the second digital signal is started to be received and a time point when the second analog signal is started to be sent, may also be a difference between a time point when receiving the second digital signal is completed and the time point when sending the second analog signal is completed. Certainly, the first processing time period T1 may also be a difference between the time point when receiving the second digital signal is completed and the time point when the second analog signal is started to be sent, which is not specifically limited in this embodiment.

As an alternative implementation of this embodiment, timing is started when the main control chip 104 sends the second analog signal to the receiving circuit module 103, and a value obtained when the main control chip 104 receives the second digital signal is recorded. The value is the circuit delay of the receiving circuit module 103. The circuit delay self-measurement device 10 in this embodiment can determine the circuit delay of the receiving circuit module 103.

Figure 11:
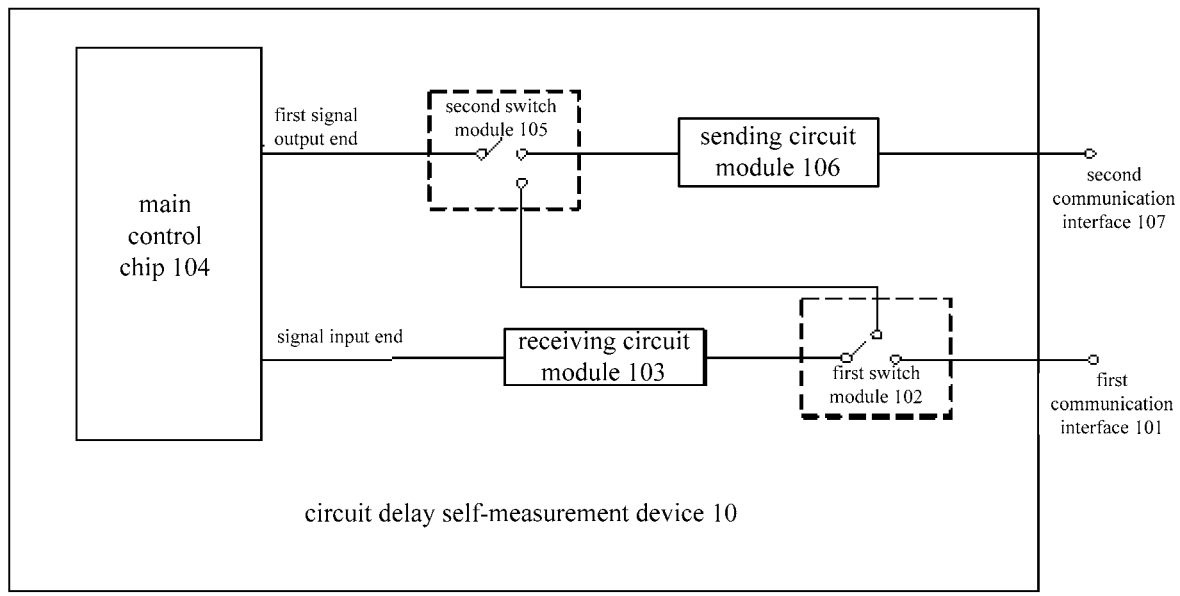
FIG. 11 is a block diagram of another circuit delay self-measurement device according to embodiment 6 of the present disclosure.
Figure 12:
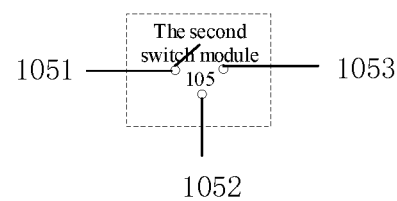
FIG. 12 is a block diagram of a second switch module according to embodiment 6 of the present disclosure.

During the process of communication between the circuit delay self-measurement device 10 and the response device in the embodiment, the communication data may be hijacked by a third party. To determine whether the communication data between the circuit delay self-measurement device 10 and the response device is hijacked, the following ways can be adopted:

Manner 1:

As an alternative implementation of the present embodiment, as illustrated in FIGS. 11 and 12, the circuit delay self-measurement device 10 further includes a second switch module 105, a sending circuit module 106 and a second communication interface 107. The second switch module 105 includes a second stationary end 1051, a third connection end 1052 and a fourth connection end 1053. Electrical connection between the second connection end 1023 and the first signal output end specifically includes follows. The second connection end 1023 and the third connection end 1052 are electrically connected. A path between the third connection end 1052 and the second stationary end 1051 is turned on. The second stationary end 1051 is electrically connected to the first signal output end. The fourth connection end 1053 is electrically connected to the sending circuit module 106. The second switch module 105 is configured to turn on a path between the second stationary end 1051 and the fourth connection end 1053 before the main control chip 104 receives the first digital signal, to turn off the path between the second stationary end 1051 and the fourth connection end 1053 and to turn on the path between the second stationary end 1051 and the third connection end 1052 after the main control chip 104 receives the first digital signal. The main control chip 104 is further configured to send a third analog signal to the sending circuit module 106 before the first communication interface 101 receives the first analog signal. The sending circuit module 106 is configured to receive a third analog signal, to perform a third processing on the third analog signal to generate a fourth analog signal, and to send the fourth analog signal through the second communication interface 107. The first analog signal is generated by a response device that receives the fourth analog signal after the response device performs a fourth processing on the fourth analog signal.

In a specific application, in order to detect whether communication data between the circuit delay self-measurement device 10 and the response device is hijacked, the main control chip 104 in the circuit delay self-measurement device 10 sends the third analog signal to the sending circuit module 106 before the first communication interface 101 receives the first analog signal. The sending circuit module 106 receives the third analog signal and performs the third processing on the third analog signal to generate the fourth analog signal. In the embodiment, the circuit delay self-measurement device 10 sends the third analog signal sent by the main control chip 104 to the response device through the sending module, and the circuit delay self-measurement device 10 and the response device together form a communication system to detect whether the communication data between the circuit delay self-measurement device 10 and the response device is hijacked.

In a specific application, as illustrated in FIG. 12, the second switch module 105 is a three-end component, in which, one end is the second stationary end 1051, and the other two ends are the third connection end 1052 and the fourth connection end 1053. Before the main control chip 104 receives the first digital signal, the second switch module 105 turns on the path between the second stationary end 1051 and the fourth connection end 1053. The main control chip 104 may send the third analog signal to the sending circuit module 106 through the second switch module 105. The third analog signal is generated by modulating the third digital signal through the main control chip 104. The third digital signal in the embodiment may be a command signal. For example, the command signal indicates that the circuit delay self-measurement device 10 reads a response device. The second switch module 105 in this embodiment may be a physical switch or a virtual switch, as long as the second switch module 105 that is capable to realize the above functions is within the protection scope of the present disclosure.

In a specific application, that the sending circuit module 106 performs the third processing on the third analog signal to generate the fourth analog signal at least includes: the sending circuit module 106 amplifying the third analog signal to generate the fourth analog signal. Certainly, in order to ensure that the fourth analog signal is sent through the second communication interface 107 with a large power, that the sending circuit module 106 performs the third processing on the third analog signal to generate the fourth analog signal includes: the sending circuit module 106 amplifying the third analog signal and then generating the fourth analog signal after matching. In this embodiment, the third analog signal is amplified by the sending circuit module 106 and sent to the response device, thereby ensuring that the power of the fourth analog signal sent by the circuit delay self-measurement device 10.

In a specific application, after the sending circuit module 106 generates the fourth analog signal, the fourth analog signal is sent through the second communication interface 107. The second communication interface 107 may be a wired communication interface (e.g. a USB interface or an audio interface), or may be a wireless communication interface (e.g. an antenna), which is not specifically limited in this embodiment. Preferably, the second communication interface 107 is a wireless communication interface, and the fourth analog signal can be sent through NFC, infrared, Bluetooth, or the like. The second communication interface 107 and the first communication interface 101 in this embodiment may refer to one communication interface, or may be two independent communication interfaces, which is not specifically limited in this embodiment.

In a specific application, the sending circuit module 106 sends the fourth analog signal. The response device receives the fourth analog signal, and performs a fourth processing on the fourth analog signal to generate the first analog signal. Performing the fourth processing on the fourth analog signal to generate the first analog signal at least includes: demodulating the fourth analog signal to generate the third digital signal, responding according to the third digital signal to generate the first digital signal, and performing a second modulation on the first digital signal to generate the first analog signal. A modulation mode of the first modulation is the same as that of the second modulation. In this embodiment, after the response device performs the fourth processing on the fourth analog signal to generate the first analog signal, the response device sends the first analog signal as a response signal to the fourth analog signal.

In a specific application, after the main control chip 104 receives the first digital signal, the second switch module 105 turns off the path between the second stationary end 1051 and the fourth connection end 1053, and turns on the path between the second stationary end 1051 and the third connection end 1052. The main control chip 104 may send the second analog signal to the receiving circuit module 103 through an electrical path connecting the first signal output end, the second switch module 105 and the first switch module 102.

In a specific application, the main control chip 104 further includes a control end. The control end is electrically connected to the first switch module 102 and the second switch module 105. The main control chip 104 is configured to send a command signal to the control end after receiving the first digital signal. The control end is configured to, after receiving the command signal, control the first switch module 102 to turn off the path between the first stationary end 1021 and the first connection end 1022, to control the first switch module 102 to turn on the path between the first stationary end 1021 and the second connection end 1023, to control the second switch module 105 to turn off the path between the second stationary end 1051 and the fourth connection end 1053, and to control the second switch module 105 to turn on the path between the second stationary end 1051 and the third connection end 1052. In detail, when the main control chip 104 completes receiving the first digital signal, the main control chip 104 sends a control signal to the control end, and controls the first switch module 102 to turn off the path between the first stationary end 1021 and the first connection end 1022 and to turn on the path between the first stationary end 1021 to the second connection end 1023 through the control end, also controls the second switch module 105 to turn off the path between the second stationary end 1051 and the fourth connection end 1053 and to turn on the path between the second stationary end 1051 and the third connection end 1052 through the control end. The main control chip 104 may send the second analog signal to the receiving circuit module 103 through the electrical path connecting the first signal output end, the second switch module 105 and the first switch module 102. The main control chip 104 according to the embodiment may control the first switch module 102 and the second switch module 105 to turn on or turn off through the control end, thereby realizing automatic control of the first switch module 102 and the second switch module 105.

In a specific application, the main control chip 104 is further configured to obtain a second processing time period T2. The second processing time period T2 is a difference between a time point when the first digital signal is received and a time point when the third analog signal is sent to the sending circuit module 106. The main control chip 104 is further configured to determine whether a time difference between the second processing time period T2 and the first processing time period T1 is less than a preset value, and if it is determined that the time difference is less than the preset value, the communication data between the circuit delay self-measurement device 10 and the response device is not hijacked. In detail, the second processing time period T2 may be a difference between a time point when the first digital signal is started to be received and a time point when sending the third analog signal to the sending circuit module 106 is completed, or may be a difference between the time point when the first digital signal is started to be received and a time point when the third analog signal is started to be sent to the sending circuit module 106, or may be a difference between a time point when receiving the first digital signal is completed and the time point when sending the third analog signal to the sending circuit module 106 is completed, certainly, the second processing time period T2 may also be a difference between the time point when receiving the first digital signal is completed and the time point when the third analog signal is started to be sent to the sending circuit module, which is not specifically limited in this embodiment.

In addition, total time from a time point of sending the third analog signal to a time point of receiving the first digital signal by the main control chip 104 in the circuit delay self-measurement device 10 is the second processing time period T2. Since the circuit delay of the sending circuit module 106 is negligible, without considering the circuit delay of the sending circuit module 106, total time from a time point when the fourth analog signal is sent to a time point when the first digital signal is received by the circuit delay self-measurement device 10 is identical to the total time from the time point when the third analog signal is sent to the time point when the first digital signal is received by the main control chip 104, both are the second processing time period T2. Since the circuit delay caused by the receiving circuit module 103 is the first processing time period T1, a time period from the time point when the fourth analog signal is sent to the time point when the first analog signal is received by the circuit delay self-measurement device 10 is the time difference between the second processing time period T2 and the first processing time period T1. The main control chip 104 determines whether the time difference between the second processing time period T2 and the first processing time period T1 is less than the preset value, if it is determined that the time difference is less than the preset value, it is determined that the communication data between the circuit delay self-measurement device 10 and the response device is not hijacked.

Figure 13:
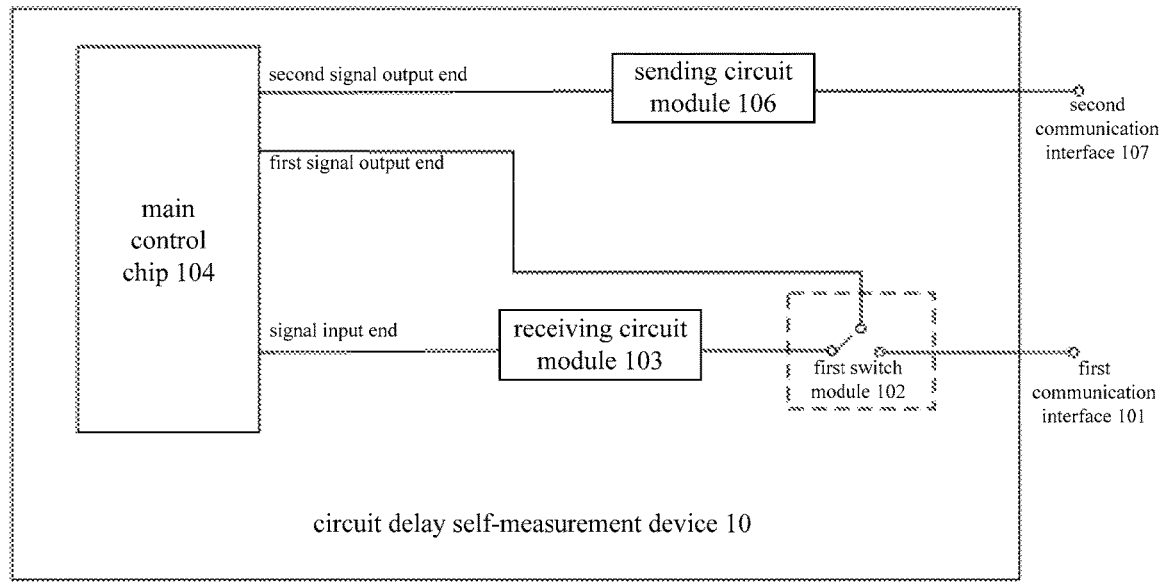
FIG. 13 is a block diagram of yet another circuit delay self-measurement device according to embodiment 6 of the present disclosure.

Manner 2:

As an alternative implementation of the present embodiment, as illustrated in FIG. 13, the circuit delay self-measurement device 10 further includes a sending circuit module 106 and a second communication interface 107. The main control chip 104 further includes a second signal output end. A first end of the sending circuit module 106 is electrically connected to the second signal output end, and a second end of the sending circuit module 106 is electrically connected to the second communication interface 107. The main control chip 104 is further configured to send a third analog signal to the sending circuit module 106 through the second signal output end before the first communication interface 101 receives the first analog signal. The sending circuit module 106 is configured to receive the third analog signal, to perform a third processing on the third analog signal to generate a fourth analog signal, and to send the fourth analog signal through the second communication interface 107. The first analog signal is generated by a response device that receives the fourth analog signal after the response device performs a fourth processing on the fourth analog signal.

In a specific application, in order to detect whether the communication data between the circuit delay self-measurement device 10 and the response device is hijacked, the main control chip 104 sends the third analog signal to the sending circuit module 106 through the second signal output end before the first communication interface 101 receives the first analog signal. The sending circuit module 106 receives the third analog signal, and performs the third processing on the third analog signal to generate the fourth analog signal. The third analog signal is generated through modulating the third digital signal by the main control chip 104. The third digital signal in this embodiment may be a command signal. For example, the circuit delay self-measurement device 10 reads the command signal of the response device. In this embodiment, the third analog signal is directly sent to the sending circuit through the second signal output end, which reduces complexity of the control of the main control chip 104.

In a specific application, a manner in which the response device performs the fourth processing on the fourth analog signal to generate the first analog signal is the same as the implementation in above Manner 1, and details are not described herein again.

In a specific application, the main control chip 104 is further configured to obtain a second processing time period T2. The second processing time period T2 is a difference between a time point when the first digital signal is received and a time point when the third analog signal is sent to the sending circuit module 106. The main control chip 104 is further configured to determine whether a time difference between the second processing time period T2 and the first processing time period T1 is less than a preset value, and if it is determined that the time difference is less than the preset value, the communication data between the circuit delay self-measurement device 10 and the response device is not hijacked. In detail, the second processing time period T2 may be a difference between a time point when the first digital signal is started to be received and a time point when sending the third analog signal to the sending circuit module 106 is completed, or may be a difference between the time point when the first digital signal is started to be received and a time point when the third analog signal is started to be sent to the sending circuit module 106, or may be a difference between a time point when receiving the first digital signal is completed and the time point when sending the third analog signal to the sending circuit module 106 is completed, certainly, the second processing time period T2 may also be a difference between the time point when receiving the first digital signal is completed and the time point when the third analog signal is started to be sent to the sending circuit module, which is not specifically limited in this embodiment.

In addition, total time from a time point of sending the third analog signal to a time point of receiving the first digital signal by the main control chip 104 in the circuit delay self-measurement device 10 is the second processing time period T2. Since the circuit delay of the sending circuit module 106 is negligible, without considering the circuit delay of the sending circuit module 106, total time from a time point when the fourth analog signal is sent to a time point when the first digital signal is received by the circuit delay self-measurement device 10 is identical to the total time from the time point when the third analog signal is sent to the time point when the first digital signal is received by the main control chip 104, both are the second processing time period T2. Since the circuit delay caused by the receiving circuit module 103 is the first processing time period T1, a time period from the time point when the fourth analog signal is sent to the time point when the first analog signal is received by the circuit delay self-measurement device 10 is the time difference between the second processing time period T2 and the first processing time period T1. The main control chip 104 determines whether the time difference between the second processing time period T2 and the first processing time period T1 is less than the preset value, if it is determined that the time difference is less than the preset value, it is determined that the communication data between the circuit delay self-measurement device 10 and the response device is not hijacked.

With the circuit delay self-measurement device 10 of the embodiment, the circuit delay of the receiving circuit module 103 in the device can be detected, and whether the communication data between the circuit delay self-measurement device 10 and the response device is hijacked can be determined.

Embodiment 7

Figure 14:
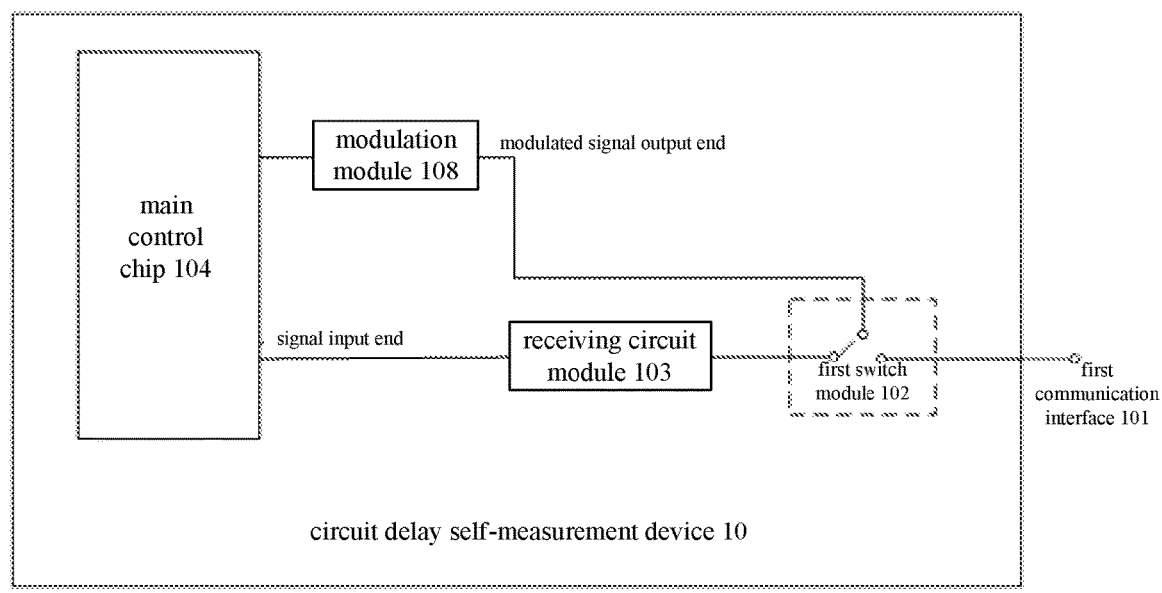
FIG. 14 is a block diagram of a circuit delay self-measurement device according to embodiment 7 of the present disclosure.

The embodiment provides another circuit delay self-measurement device 10. As illustrated in FIGS. 14 and 10, the circuit delay self-measurement device 10 includes a main control chip 104, a first communication interface 101, a first switch module 102, a receiving circuit module 103 and a modulation module 108. The main control chip 104 includes at least a first signal output end and a signal input end. The first switch module 102 includes a first stationary end 1021, a first connection end 1022 and a second connection end 1023. The modulation module 108 at least includes a modulation signal input end and a modulated signal output end. The modulation signal input end is electrically connected to the first signal output end. The first stationary end 1021 is electrically connected to the receiving circuit module 103. The first connection end 1022 is electrically connected to the first communication interface 101. The second connection end 1023 is electrically connected to the modulated signal output end. The first communication interface 101 is configured to receive the first analog signal when a path between the first stationary end 1021 and the first connection end 1022 is turned on, and to send the first analog signal to the receiving circuit module 103. The receiving circuit module 103 is configured to receive the first analog signal, to perform a first processing on the first analog signal to generate a first digital signal, and to send the first digital signal to the signal input end of the main control chip 104. The main control chip 104 is configured to receive the first digital signal, and to send the first digital signal to the modulation module 108. The first switch module 102 is configured to, when the main control chip 104 completes receiving the first digital signal, turn off the path between the first stationary end 1021 and the first connection end 1022 and to turn on a path between the first stationary end 1021 and the second connection end 1023. The modulating module 108 is configured to receive the first digital signal, to modulate the first digital signal to generate a second analog signal, and to send the second analog signal to the receiving circuit module 103 through the modulated signal output end. The receiving circuit module 103 is further configured to receive the second analog signal and to perform a first processing on the second analog signal to generate a second digital signal, where the second digital signal is identical to the first digital signal. The main control chip 104 is further configured to receive the second digital signal, to obtain a first processing time period T1, in which the first processing time period T1 is a difference between a time point when the second digital signal is received and a time point when the first digital signal is sent, and to determine that the circuit delay of the receiving circuit module 103 is the first processing time period T1.

Different from Embodiment 6, the main control chip 104 in this embodiment does not have a modulation function, and the modulation module 108 modulates the first digital signal to generate the second analog signal. In addition, the second connection end 1023 of the first switch module 102 is electrically connected to the modulated signal output end, and the modulation module 108 sends the second analog signal to the receiving circuit module 103 through the modulated signal output end of the modulation module 108.

In this embodiment, the first processing time period T1 obtained by the main control chip 104 is the difference between the time point when the second digital signal is obtained and the time point when the first digital signal is sent. Due to the absence of a circuit delay caused by a filter in the modulation module 108, and the circuit delay caused by the modulation module 108 is negligible, the circuit delay of the receiving circuit module 103 is the first processing time period T1 without considering the circuit delay caused by the modulation module 108. The main control chip 104 may obtain the first processing time period T1 through a following manner. Timing starts when the main control chip 104 sends the first digital signal to the receiving circuit module 103, and a value obtained by the timing when the main control chip 104 receives the second digital signal is recorded. The value is determined as the first processing time period T1.

As an alternative implementation of the present disclosure, the first processing time period T1 may be a difference between a time point when the second digital signal is started to be received and a time point when sending the second analog signal is completed, or a difference between the time point when the second digital signal is started to be received and a time point when the second analog signal is started to be sent, or a difference between a time point when receiving the second digital signal is completed and the time point when sending the second analog signal is completed, certainly, the first processing time period T1 may also be a difference between the time point when receiving the second digital signal is completed and the time point when the second analog signal is started to be sent, which is not specifically limited in this embodiment.

In the embodiment, communication data between the circuit delay self-measurement device 10 and the response device may be hijacked by a third party during a communication process between the circuit delay self-measurement device 10 and the response device. To determine whether the communication data between the circuit delay self-measurement device 10 and the response device is hijacked, following implementations can be adopted.

Figure 15:
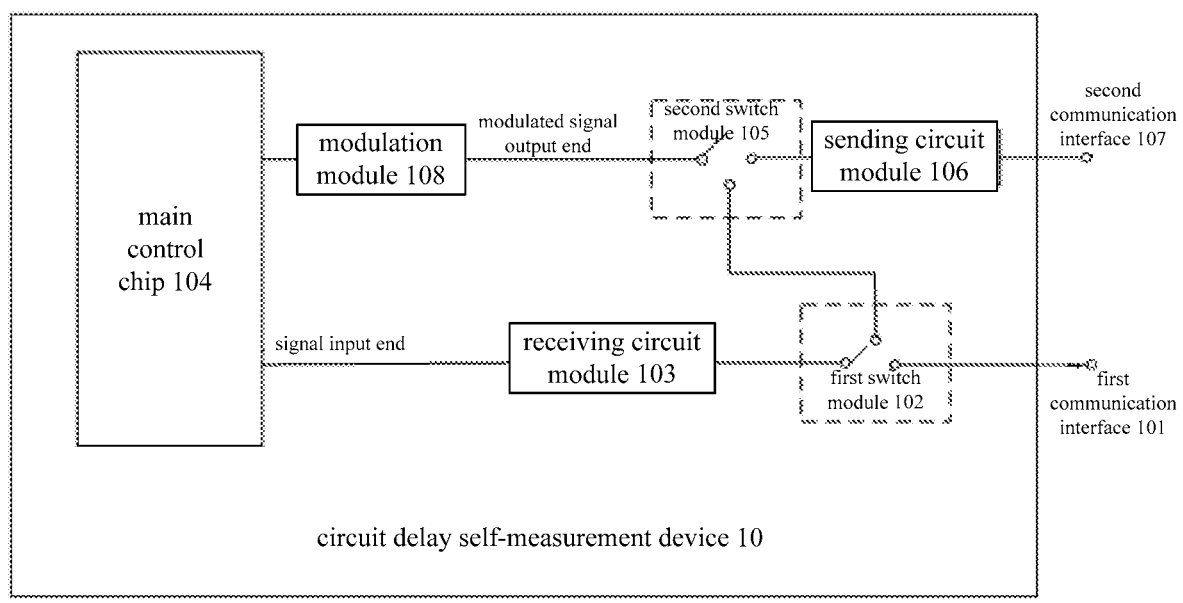
FIG. 15 is a block diagram of another circuit delay self-measurement device according to embodiment 7 of the present disclosure.

As an alternative implementation of the present embodiment, as illustrated in FIGS. 15 and 12, the circuit delay self-measurement device 10 further includes a second switch module 105, a sending circuit module 106 and the second communication interface 107. The second switch module 105 includes a second stationary end 1051, a third connection end 1052 and a fourth connection end 1053. An electrical connection between the second connection end 1023 and the modulated signal output end specifically includes follows. The second connection end 1023 is electrically connected to the third connection end 1052. A path between the third connection end 1052 and the second stationary end 1051 is turned on. The second stationary end 1051 is electrically connected to the modulated signal output end. The fourth connection end 1053 is electrically connected to the sending circuit module 106. The second switch module 105 is configured to turn on a path between the second stationary end 1051 and the fourth connection end 1053 before the main control chip 104 receives the first digital signal. The second switch module 105 is further configured to turn off the path between the second stationary end 1051 and the fourth connection end 1053 and to turn on the path between the second stationary end 1051 and the third connection end 1052 after the main control chip 104 receives the first digital signal. The main control chip 104 is further configured to send a third digital signal to the modulation module 108 before the first communication interface 101 receives the first analog signal. The modulating module 108 is configured to receive the third digital signal, to modulate the third digital signal to generate the third analog signal, and to send the third analog signal to the sending circuit module 106. The sending circuit module 106 is configured to receive the third analog signal, to perform a third processing on the third analog signal to generate a fourth analog signal, and to send the fourth analog signal through the second communication interface 107, where the first analog signal is generated by a response device that receives the fourth analog signal after the response device performs a fourth processing on the fourth analog signal.

Different from Manner 1 of Embodiment 6, the main control chip 104 does not have a modulation function, and the main control chip 104 sends the third digital signal to the modulation module 108 before the communication interface receives the first analog signal. The modulation module 108 receives the third digital signal and modulates the third digital signal to generate the third analog signal. The modulation module 108 realizes the modulation on the third digital signal.

As an alternative implementation of the embodiment, the main control chip 104 further includes a control end. The control end is electrically connected to the first switch module 102 and the second switch module 105. The main control chip 104 is configured to send a control signal to the control end when the first digital signal is received. The control end is configured to, after receiving the control signal, control the first switch module 102 to turn off the path between the first stationary end 1021 and the first connection end 1022 and to turn on the path between the first stationary end 1021 and the second connection end 1023, and to control the second switch module 105 to turn off the path between the second stationary end 1051 and the fourth connection end 1053 and to turn on the path between the second stationary end 1051 and the third connection end 1052. The main control chip 104 of the embodiment controls the first switch module 102 and the second switch module 105 to turn on or turn off through the control end, thereby realizing automatic control of the first switch module 102 and the second switch module 105.

As an alternative implementation of the embodiment, the main control chip 104 is further configured to obtain a second processing time period T2. The second processing time period T2 is a difference between a time point when the first digital signal is received and a time point when the third analog signal is sent to the modulation module 108. The main control chip 104 is further configured to determine whether a time difference between the second processing time period T2 and the first processing time period T1 is less than a preset value, and if it is determined that the time difference is less than the preset value, it is determined that the communication data between the circuit delay self-measurement device 10 and the response device is not hijacked. In detail, the second processing time period T2 may be a difference between a time point when the first digital signal is started to be received and a time point when sending of the third analog signal to the sending circuit module 106 is completed, or may be a difference between the time point when the first digital signal is started to be received and a time point when the third analog signal is started to be sent to the sending circuit module 106, or may be a difference between a time point when receiving the first digital signal is completed and the time point when sending the third analog signal to the sending circuit module 106 is completed, certainly, may also be a difference between the time point when receiving the first digital signal is completed and the time point when the third analog signal is started to be sent to the sending circuit module, which is not specifically limited in this embodiment.

In addition, total time from a time point of sending the third digital signal to the modulation module 108 to a time point of receiving the first digital signal by the main control chip 104 in the circuit delay self-measurement device 10 is the second processing time period T2. Since the circuit delay of the modulation module 108 and the sending circuit module 106 is negligible, without considering the circuit delay of the modulation module 108 and the sending circuit module 106, total time from a time point of sending the fourth analog signal to a time point of receiving the first digital signal by the circuit delay self-measurement device 10 is identical to the total time from the time point of sending the third digital signal to the modulation module 108 by the main control chip 104 to the time point of receiving the first digital signal by the main control chip 104, both are the second processing time period T2. Since the circuit delay caused by the receiving circuit module 103 is the first processing time period T1, a time period from the time point when the fourth analog signal is sent by the circuit delay self-measurement device 10 to the time point when the first analog signal is received by the circuit delay self-measurement device 10 is the time difference between the second processing time period T2 and the first processing time period T1. The main control chip 104 determines whether the time difference between the second processing time period T2 and the first processing time period T1 is less than the preset value, if it is determined that the time difference is less than the preset value, it is determined that the communication data between the circuit delay self-measurement device 10 and the response device is not hijacked.

With the circuit delay self-measurement device 10 of the embodiment, the circuit delay of the receiving circuit module 103 in the device can be detected, and whether the communication data between the circuit delay self-measurement device 10 and the response device is hijacked can be determined.

Embodiment 8

Figure 16:
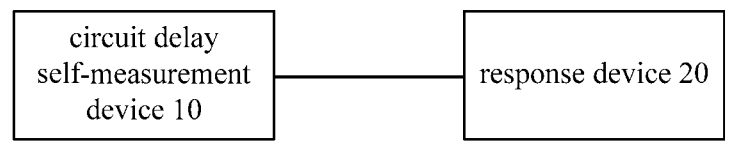
FIG. 16 is a block diagram of a circuit delay self-measurement system according to embodiment 8 of the present disclosure.

The embodiment provides a circuit delay self-measurement system. As illustrated in FIG. 16, the circuit delay self-measurement system includes a circuit delay self-measurement device 10 and a response device 20.

The circuit delay self-measurement device 10 is the circuit delay self-measurement device 10 in the above Embodiments 6 and 2 which can determine whether communication data between the circuit delay self-measurement device 10 and the response device 20 is hijacked.

The response device 20 is configured to receive a fourth analog signal, to perform a fourth processing on the fourth analog signal to generate a first analog signal, and to send the first analog signal to the first communication interface of the circuit delay self-measurement device 10. In detail, performing the fourth processing on the fourth analog signal by the response device 20 to generate the first analog signal includes follows. The response device 20 demodulates the fourth analog signal to generate a third digital signal, responds according to the third digital signal to generate the first digital signal, and performing a second modulation on the first digital signal to generate the first analog signal. A modulation mode of the first modulation is the same as a modulation mode of the second modulation. In this embodiment, after the response device 20 performs the fourth processing on the fourth analog signal to generate the first analog signal, the response device 20 sends the first analog signal as a response signal to the fourth analog signal.

As an alternative implementation, the response device 20 is further configured to obtain a third processing time period T3. The third processing time period T3 is a difference between a time point when the first analog signal is sent to the first communication interface of the circuit delay self-measurement device 10 and a time point when the fourth analog signal is received. The preset value is greater than the third processing time period T3. In detail, the third processing time period T3 may be a difference between a time point when the first analog signal is started to be sent to the first communication interface of the circuit delay self-measurement device 10 and a time point when receiving the fourth analog signal is completed, or may a difference between the time point when the first analog signal is started to be sent to the first communication interface of the circuit delay self-measurement device 10 and a time point when the fourth analog signal is started to be received, or may a difference between a time point when sending the first analog signal to the first communication interface of the circuit delay self-measurement device 10 is completed and the time point when receiving the fourth analog signal is completed, certainly, may also be a difference between the time point when sending the first analog signal to the first communication interface of the circuit delay self-measurement device 10 is completed and the time point when the fourth analog signal is started to be received, which is not specifically limited in this embodiment.

In addition, the third processing time period T3 represents a time period required by the response device 20 from receiving the fourth analog signal to sending the first analog signal. If the response device 20 and the circuit delay self-measurement device 10 are close to each other, transmission time of a signal between the response device 20 and the circuit delay self-measurement device 10 can be ignored, in the case of ignoring the transmission time between the response device 20 and the circuit delay self-measurement device 10, a time period from the time point when the fourth analog signal is sent by the circuit delay self-measurement device 10 to the time point when the first analog signal is received (i.e., the time difference between the second processing time period T2 and the first processing time period T1) is the same as the third processing time period T3. The circuit delay self-measurement device 10 determines whether the time difference between the second processing time period T2 and the first processing time period T1 is less than the preset value, in which the preset value is greater than the third processing time period T3. If it is determined that the time difference is less than the preset value, it is determined that the communication data between the circuit delay self-measurement device 10 and the response device 20 is not hijacked.

It should be noted that, in order to ensure the accuracy of determining whether the communication data is hijacked, the preset value may be greater than the third processing time period T3 and the difference between the preset value and the third processing time period T3 may not be too large.

With the circuit delay self-measurement system provided in the embodiment, the circuit delay of the receiving circuit module in the circuit delay self-measurement 10 may be detected, and it may also determine whether the communication data is hijacked during the communication between the circuit delay self-measurement device 10 and the response device 20.

Any procedure or method described in the flow charts or described in any other way herein may be understood include one or more modules, portions or parts for executing instruction codes that implement steps of a specific logic function or procedure. The scope of a preferred embodiment of the present disclosure includes other implementations, in which the order of execution is different from when is depicted or discussed, including executing functions in a substantially simultaneous manner or in an opposite order according to the related functions, which may be understood by those skilled in the art.

It should be understood that, respective parts of the present disclosure may be implemented by the hardware, software, firmware or a combination thereof. In the above implementations, a plurality of steps or methods may be implemented by the software or firmware that is stored in the memory and executed by an appropriate instruction executing system. For example, if it is implemented by the hardware, likewise in another embodiment, the steps or methods may be implemented by one or a combination of the following techniques known in the art: a discrete logic circuit(s) having a logic gate for implementing logic functions upon data signals, an appropriate combination logic gate circuit having an appropriate combinational logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "an example," "a specific example," or "some examples," means that a particular feature, or characteristic described in connection with the embodiment or example is included in at least one embodiment or example of the present disclosure. The appearances of the phrases such as "an embodiment," "some embodiments," "an example," "a specific example," or "some examples," in various places throughout this specification are not necessarily referring to the same embodiment or example of the present disclosure. Furthermore, the particular features, or characteristics may be combined in any suitable manner in one or more embodiments or examples.

Although embodiments of the present disclosure have been shown and described above, it should be understood that, the above embodiments are exemplary, and it would be appreciated by those skilled in the art that the above embodiments cannot be construed to limit the present disclosure, and changes, alternatives, and modifications can be made in the embodiments without departing from scope of the present disclosure. The scope of the present disclosure is limited by claims and their equivalents.

What is claimed is:

1. A circuit delay self-measurement method, comprising:
receiving a first analog signal, and performing a first processing on the first analog signal to generate a first digital signal;
obtaining the first digital signal, performing a second processing on the first digital signal to generate a second analog signal, and sending the second analog signal;
receiving the second analog signal, and performing the first processing on the second analog signal to generate a second digital signal, the second digital signal being identical to the first digital signal;
obtaining the second digital signal; and
obtaining a first processing time period T1, the first processing time period T1 being a difference between a time point when the second digital signal is obtained and a time point when the second analog signal is sent, and determining that the circuit delay is the first processing time period T1.

2. The method according to claim 1, wherein before receiving the first analog signal, the method further comprises:
sending a third analog signal, wherein the first analog signal is generated by a response device through performing a third processing on the third analog signal after the response device received the third analog signal.

3. The method according to claim 2, further comprising:
obtaining a second processing time period T2, the second processing time period T2 being a difference between a time point when the first digital signal is obtained and a time point when the third analog signal is sent; and
calculating a time difference between the second processing time period T2 and the first processing time period T1, and determining whether the time difference is less than a preset value, determining that communication data is not hijacked in response to determining that the time difference is less than the preset value.

4. The method according to claim 3, wherein
performing the third processing on the third analog signal by the response device that receives the third analog signal at least comprises:
demodulating, by the response device, the third analog signal to generate the third digital signal, generating the first digital signal in response to the third digital signal, and performing the second modulation on the first digital signal to generate the first analog signal, wherein a modulation mode of the second modulation is same as a modulation mode of the first modulation.

5. The method according to claim 1, wherein
performing the first processing on the first analog signal to generate the first digital signal comprises: demodulating the first analog signal to generate the first digital signal;
performing the second processing on the first digital signal to generate the second analog signal comprises: performing a first modulation on the first digital signal to generate the second analog signal; and
performing the first processing on the second analog signal to generate the second digital signal comprises: demodulating the second analog signal to generate the second digital signal.

6. The method according to claim 5, wherein
performing the third processing on the third analog signal at least comprises:
demodulating, by the response device, the third analog signal to generate the third digital signal, generating the first digital signal in response to the third digital signal, and performing the second modulation on the first digital signal to generate the first analog signal, wherein a modulation mode of the second modulation is same as a modulation mode of the first modulation.

7. The method according to claim 2, wherein
performing the third processing on the third analog signal by the response device that receives the third analog signal at least comprises:
demodulating, by the response device, the third analog signal to generate the third digital signal, generating the first digital signal according to the third digital signal, and performing the second modulation on the first digital signal to generate the first analog signal, wherein a modulation mode of the second modulation is same as a modulation mode of the first modulation.

8. A circuit delay self-measurement device, comprising a main control chip, a first communication interface, a first switch module, and a receiving circuit module, wherein,
the main control chip comprises at least a first signal output end and a signal input end;
the first switch module comprises a first stationary end, a first connection end and a second connection end;
the first stationary end is electrically connected to the receiving circuit module; the first connection end is electrically connected to the first communication interface; the second connection end is electrically connected to the first signal output end;
the first communication interface is configured to receive a first analog signal when a path between the first stationary end and the first connection end is turned on, and to send the first analog signal to the receiving circuit module;
the receiving circuit module is configured to receive the first analog signal, to perform a first processing on the first analog signal to generate a first digital signal, and to send the first digital signal to the signal input end of the main control chip;
the main control chip is configured to receive the first digital signal, and to perform a second processing on the first digital signal to generate a second analog signal;
the first switch module is configured to turn off the path between the first stationary end and the first connection end and to turn on a path between the first stationary end and the second connection end when the main control chip completes receiving the first digital signal;
the main control chip is further configured to send the second analog signal to the receiving circuit module through the first signal output end when the path between the first stationary end and the second connection end is turned on;

the receiving circuit module is further configured to receive the second analog signal, and to perform the first processing on the second analog signal to generate a second digital signal, the second digital signal being identical to the first digital signal;

the main control chip is further configured to receive the second digital signal, to obtain a first processing time period T1, the first processing time period T1 being a difference between a time point when the second digital signal is obtained and a time point when the second analog signal is sent, and to determine that the circuit delay of the receiving circuit module is the first processing time period T1.

9. The device according to claim 8, further comprising a second switch module, a sending circuit module, and a second communication interface, wherein the second switch module comprises a second stationary end, a third connection end and a fourth connection end;

electrical connection between the second connection end and the first signal output end comprises: the second connection end being electrically connected to the third connection end; a path between the third connection end and the second stationary end is turned on; and the second stationary end being electrically connected to the first signal output end;

the fourth connection end is electrically connected to the sending circuit module;

the second switch module is configured to turn on a path between the second stationary end and the fourth connection end before the main control chip receives the first digital signal, and to turn off the path between the second stationary end and the fourth connection end, and to turn on the path between the second stationary end and the third connection end after the main control chip receives the first digital signal;

the main control chip is further configured to send a third analog signal to the sending circuit module before the first communication interface receives the first analog signal;

the sending circuit module is configured to receive the third analog signal, to perform a third processing on the third analog signal to generate a fourth analog signal, and to send the fourth analog signal through the second communication interface, wherein the first analog signal is generated through performing a third processing on the third analog signal after the response device received the third analog signal.

10. The device according to claim 9, wherein the main control chip further comprises: a control end electrically connected to the first switch module and the second switch module;

the main control chip is configured to send a control signal to the control end, when the first digital signal is received; and the control end is configured to, after receiving the control signal, control the first switch module to turn off the path between the first stationary end and the first connection end, to control the first switch module to turn on the path between the first stationary end and the second connection end, to control the second switch module to turn off the path between the second stationary end and the fourth connection end, and to control the second switch module to turn on the path between the second stationary end and the third connection end.

11. The device according to claim 10, wherein the main control chip is further configured to obtain a second processing time period T2, the second processing time period T2 is a difference between a time point when the first digital signal is received and a time point when the third analog signal is sent to the sending circuit module, to determine whether a time difference between the second processing time period T2 and the first processing time period T1 is less than a preset value, to determine that communication data between the circuit delay self-measurement device and the response device is not hijacked, in response to determining that the time difference is less than the preset value.

12. The device according to claim 9, wherein the main control chip is further configured to obtain a second processing time period T2, the second processing time period T2 is a difference between a time point when the first digital signal is received and a time point when the third analog signal is sent to the sending circuit module, to determine whether a time difference between the second processing time period T2 and the first processing time period T1 is less than a preset value, to determine that communication data between the circuit delay self-measurement device and the response device is not hijacked, in response to determining that the time difference is less than the preset value.

13. A circuit delay self-measurement system, comprising the circuit delay self-measurement device and the response device according to claim 12, wherein the response device is configured to receive the fourth analog signal, to perform a fourth processing on the fourth analog signal to generate the first analog signal, and to send the first analog signal to the first communication interface of the circuit delay self-measurement device.

14. The system according to claim 13, wherein the response device is further configured to obtain a third processing time period T3, the third processing time period T3 is a difference between a time point when the first analog signal is sent to the first communication interface of the circuit delay self-measurement device and a time point when the fourth analog signal is received; and the preset value is greater than the third processing time period T3.

15. The device according to claim 8, further comprising a sending circuit module and a second communication interface, wherein, the main control chip further comprises a second signal output end;

a first end of the sending circuit module is electrically connected to the second signal output end, and a second end of the sending circuit module is electrically connected to the second communication interface;

the main control chip is further configured to send the third analog signal to the sending circuit module through the second signal output end before the first communication interface receives the first analog signal;

the sending circuit module is configured to receive the third analog signal, to perform a third processing on the third analog signal to generate a fourth analog signal, and to send the fourth analog signal through the second communication interface, wherein the first analog signal is generated by a response device that receives the fourth analog signal after the response device performs a fourth processing on the fourth analog signal.

16. The device according to claim 15, wherein the main control chip further comprises: a control end electrically connected to the first switch module;
the main control chip is configured to send a control signal to the control end when the first digital signal is received; and
the control end is configured to, after receiving the control signal, control the first switch module to turn off the path between the first stationary end and the first connection end, and to control the first switch module to turn on the path between the first stationary end and the second connection end.

17. The device according to claim 15, wherein
the main control chip is further configured to obtain a second processing time period T2, the second processing time period T2 is a difference between a time point when the first digital signal is received and a time point when the third analog signal is sent to the sending circuit module, to determine whether a time difference between the second processing time period T2 and the first processing time period T1 is less than a preset value, to determine that communication data between the circuit delay self-measurement device and the response device is not hijacked, in response to determining that the time difference is less than the preset value.

18. The device according to claim 8, wherein the main control chip further comprises: a control end electrically connected to the first switch module;
the main control chip is configured to send a control signal to the control end when the first digital signal is received; and
the control end is configured to, after receiving the control signal, control the first switch module to turn off the path between the first stationary end and the first connection end, and to control the first switch module to turn on the path between the first stationary end and the second connection end.

19. The device according to claim 18, wherein
the main control chip is further configured to obtain a second processing time period T2, the second processing time period T2 is a difference between a time point when the first digital signal is received and a time point when the third analog signal is sent to the sending circuit module, to determine whether a time difference between the second processing time period T2 and the first processing time period T1 is less than a preset value, to determine that communication data between the circuit delay self-measurement device and the response device is not hijacked, in response to determining that the time difference is less than the preset value.

20. The device according to claim 8, further comprising a modulation module, wherein,
the modulation module comprises at least a modulation signal input end and a modulated signal output end;
the second connection end is electrically connected to the first signal output end through the modulation module, wherein, the modulation signal input end is electrically connected to the first signal output end, and the second connection end is electrically connected to the modulated signal output end;
the main control chip is configured to send the first digital signal to the modulation module;
the modulation module is configured to receive the first digital signal, to modulate the first digital signal to generate the second analog signal, and to send the second analog signal to the receiving circuit module through the modulated signal output end.

* * * * *